(12) United States Patent
Zhou

(10) Patent No.: US 10,499,319 B2
(45) Date of Patent: Dec. 3, 2019

(54) METHOD AND DEVICE FOR PROCESSING ACCESS NETWORK INFORMATION OF UE, AND PCRF

(71) Applicant: ZTE CORPORATION, Shenzhen, Guangdong Province (CN)

(72) Inventor: Xiaoyun Zhou, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 738 days.

(21) Appl. No.: 15/025,726

(22) PCT Filed: Apr. 30, 2014

(86) PCT No.: PCT/CN2014/076668
§ 371 (c)(1),
(2) Date: Mar. 29, 2016

(87) PCT Pub. No.: WO2014/180277
PCT Pub. Date: Nov. 13, 2014

(65) Prior Publication Data
US 2016/0249282 A1    Aug. 25, 2016

(30) Foreign Application Priority Data

Sep. 30, 2013   (CN) .......................... 2013 1 0465535

(51) Int. Cl.
*H04W 4/00*    (2018.01)
*H04W 48/16*   (2009.01)
(Continued)

(52) U.S. Cl.
CPC ......... *H04W 48/16* (2013.01); *H04L 12/1407* (2013.01); *H04M 15/62* (2013.01);
(Continued)

(58) Field of Classification Search
None
See application file for complete search history.

(56) References Cited

U.S. PATENT DOCUMENTS

2011/0320580 A1   12/2011   Zhou
2012/0020345 A1*  1/2012    Zhou ...................... H04L 12/14
                                                          370/338
(Continued)

FOREIGN PATENT DOCUMENTS

CN    101453722 A    6/2009
CN    101841797 A    9/2010
(Continued)

OTHER PUBLICATIONS

Zhou_machine translation—CN102215544(A)_pub.date_2011-10-12.pdf.*
(Continued)

*Primary Examiner* — Jinsong Hu
*Assistant Examiner* — Alexander J Yi

(57) ABSTRACT

The present disclosure provides a method and device for processing access network information of UE, a PCRF, a BBERF and an AF. The method includes that: a PCRF receives a request from an AF, wherein the request is used for requesting to report access network information; the PCRF judges whether an access network where the UE is located supports reporting of the access network information or not; and under the condition that a judgment result is that the access network where the UE is located does not support the reporting of the access network information, the PCRF feeds back to the AF first indication information indicating a failure of reporting the access network information. By the present disclosure, the effects of accurately feeding back the (Continued)

access network information, greatly improving feedback efficiency and avoiding the application layer processing error are further achieved.

4 Claims, 20 Drawing Sheets

(51) Int. Cl.
*H04W 4/24* (2018.01)
*H04M 15/00* (2006.01)
*H04W 48/18* (2009.01)
*H04L 12/14* (2006.01)
*H04W 28/24* (2009.01)
*H04W 24/04* (2009.01)

(52) U.S. Cl.
CPC .............. *H04M 15/66* (2013.01); *H04W 4/24* (2013.01); *H04W 48/18* (2013.01); *H04W 24/04* (2013.01); *H04W 28/24* (2013.01)

(56) References Cited

U.S. PATENT DOCUMENTS

| | | | |
|---|---|---|---|
| 2012/0196644 A1* | 8/2012 | Scherzer | H04W 48/18 455/524 |
| 2012/0230287 A1* | 9/2012 | Stenfelt | H04L 12/5695 370/329 |

FOREIGN PATENT DOCUMENTS

| | | |
|---|---|---|
| CN | 102215544 A | 10/2011 |
| CN | 102215544 | 12/2011 |
| CN | 102340866 A | 2/2012 |
| EP | 2571327 A1 | 3/2013 |
| WO | WO 2011/120366 A1 | 10/2011 |

OTHER PUBLICATIONS

Zhou_machine_translation—CN101867909(A)-pub.date_2010-10-20.pdf.*
International Search Report (Form PCT/ISA/210) for International Application No. PCT/CN2014/076668 dated Jul. 29, 2014.
European Search Report for Application No. 14794009; dated Sep. 6, 2016.

* cited by examiner

METHOD AND DEVICE FOR PROCESSING ACCESS NETWORK INFORMATION OF UE, AND PCRF

TECHNICAL FIELD

The present disclosure relates to the field of communication, and in particular to a method and device for processing access network information of User Equipment (UE), a Policy and Charging Rules Function (PCRF), a Bearer Binding and Event Report Function (BBERF) and an Application Function (AF).

BACKGROUND

FIG. 1 is a diagram showing an architecture of a Policy and Charging Control (PCC) defined by 3rd Generation Partnership Project (3GPP) according to a related art, and as shown in FIG. 1, a PCRF makes a Quality of Service (QoS) and charging policy for usage of a network resource for a service. Control policy making of the PCRF requires combination of service information received from an AF, subscription information received from a Subscription Profile Repository (SPR), a policy configured by an operator and the like. The PCRF transmits a control policy made for the service to a Policy and Charging Enforcement Function (PCEF) or a BBERF for enforcement. Meanwhile, the PCRF may subscribe for a related event of a bearer layer to the PCEF and/or the BBERF to timely perceive the event and modify the control policy when the event occurs to the bearer layer. Moreover, the PCEF and a Traffic Detection Function (TDF) may enforce an Application Detection and Control (ADC) function according to a PCC rule (PCEF) or ADC rule (TDF) issued by the PCRF.

A Proxy-Call Session Control Function (P-CSCF) may be an AF. The P-CSCF may provide for the PCRF service information of an Internet Protocol Multimedia System (IMS), so as to ensure QoS of service access of a user through the IMS. In addition, the P-CSCF may also acquire from the PCRF, related information of a network accessed by current UE, for IMS management, charging and control. At present, an IMS may acquire current position information of a user through a PCC architecture for legal monitoring, charging and service control. However, such a mechanism is only supported by some access networks (for example, a 3GPP access network) at present. When the P-CSCF makes a request for current position information of the UE to the PCRF, the P-CSCF may not know that the UE does not access an access network supporting reporting of the access network information. There is yet no solution to how to process the request after the PCRF receives the request of the P-CSCF. In addition, in consideration of an IP Flow Mobility (IFOM) scenario, FIG. 2 is a diagram showing IFOM according to the related art, and as shown in FIG. 2, multiple service data flows of a user session may be transmitted in different access networks (for example, a voice is transmitted in a 3GPP access network, while a video is transmitted in a Wireless Local Area Network (WLAN)), and there is also yet no solution to the problem of how to report position information to the P-CSCF by the PCRF.

Therefore, in the related art, there exists a problem of application layer processing error caused by incapability of reporting the access network information or low efficiency of reporting access network information.

SUMMARY

A method and device for processing access network information of UE, a PCRF, a BBERF and an AF are provided in the embodiment of the present disclosure, so as to at least solve the problem of application layer processing error caused by incapability of reporting the access network information or low efficiency of reporting the access network information.

According to one aspect of the present disclosure, a method for processing access network information of User Equipment (UE) is provided, comprising: receiving, by a Policy and Charging Rules Function (PCRF), a request from an Application Function (AF), wherein the received request is used for requesting to report the access network information; judging, by the PCRF, whether an access network where the UE is located supports reporting of the access network information or not; when a judgment result is that the access network where the UE is located does not support the reporting of the access network information, feeding back, by the PCRF, to the AF, first indication information indicating a failure of reporting the access network information; and/or, when the judgment result is that the access network where the UE is located support the reporting of the access network information, or whether the access network where the UE is located supports the reporting of the access network information or not is not able to be judged, sending, by the PCRF, a request to a Policy and Charging Enforcement Function (PCEF), wherein the sent request is used for requesting to report the access network information; when the PCEF determines that the access network where the UE is located does not support the reporting of the access network information, receiving, by the PCRF, second indication information, fed back by the PCEF, indicating a failure of reporting the access network information; and sending, by the PCRF, the received second indication information to the AF.

In an example embodiment of the present disclosure, judging, by the PCRF, whether the access network where the UE is located supports the reporting of the access network information or not comprises: when there is one access network where the UE is located, judging, by the PCRF, whether the access network where the UE is located supports the reporting of the access network information or not; or, when there are at least two access networks where the UE is located, respectively judging, by the PCRF, whether an access network, through which each service data stream of a session performed with the AF is transmitted, supports the reporting of the access network information or not.

In an example embodiment of the present disclosure, a condition that there is one access network where the UE is located, refers to a condition that the UE accesses a network in a single-access manner or a Multi-Access Packet Data Network (PDN) Connectivity (MAPCON) manner; and a condition that there are at least two access networks where the UE is located, refers to a condition that the UE accesses the network in an Internet Protocol Flow Mobility (IFOM) manner.

In an example embodiment of the present disclosure, when the PCEF determines that the access network where the UE is located supports the reporting of the access network information or the PCEF is not able to judge whether the access network where the UE is located supports the reporting of the access network information or not, further comprising: when feedback information received by the PCEF does not comprise the access network information after the PCEF sends to the access network a request used for requesting to report the access network information, receiving, by the PCRF, third indication information, sent by the PCEF, indicating a failure of reporting the access network information; and sending, by the PCRF, the received third indication information to the AF.

In an example embodiment of the present disclosure, when the PCEF determines that the access network where the UE is located supports the reporting of the access network information or the PCEF is not able to judge whether the access network where the UE is located supports the reporting of the access network information or not, further comprising: when feedback information received by the PCEF comprises the access network information after the PCEF sends to the access network a request used for requesting to report the access network information, receiving, by the PCRF, the access network information sent by the PCEF; and sending, by the PCRF, the received access network information to the AF.

In an example embodiment of the present disclosure, after judging, by the PCRF, whether the access network where the UE is located supports the reporting of the access network information or not, further comprising: when the judgment result is that the access network where the UE is located supports the reporting of the access network information, or whether the access network where the UE is located supports the reporting of the access network information or not is not able to be judged, sending, by the PCRF, to a Bearer Binding and Event Report Function (BBERF), a request used for requesting to report the access network information; when feedback information received by the BBERF does not comprise the access network information after the BBERF sends to the access network a request used for requesting to report the access network information, receiving, by the PCRF, fourth indication information, sent by the BBERF, indicating a failure of reporting the access network information; and sending, by the PCRF, the received fourth indication information to the AF.

In an example embodiment of the present disclosure, after judging, by the PCRF, whether the access network where the UE is located supports the reporting of the access network information or not, further comprising: when the judgment result is that the access network where the UE is located supports the reporting of the access network information, or whether the access network where the UE is located supports the reporting of the access network information or not is not able to be judged, sending, by the PCRF, to a BBERF, a request used for requesting to report the access network information; when feedback information received by the BBERF comprises the access network information after the BBERF sends to the access network a request used for requesting to report the access network information, receiving, by the PCRF, the access network information sent by the BBERF; and sending, by the PCRF, the received access network information to the AF.

In an example embodiment of the present disclosure, after receiving, by the PCRF, the request from the AF, wherein the received request is used for requesting to report the access network information, further comprising: judging, by the PCRF, whether a network element except the access network in an access system where the UE is located, and/or a network element except the access network in an access system through which each service data flow of a session performed with the AF is transmitted support/supports the reporting of the access network information or not.

In an example embodiment of the present disclosure, wherein the PCRF judges whether the access network where the UE is located supports the reporting of the access network information or not according to one of: a type of an Internet Protocol Connectivity Access Network (IP-CAN); the type of the IP-CAN and a type of a Radio Access Technology (RAT); the type of the RAT and trusted/untrusted indication information.

According to another aspect of the present disclosure, a method for processing access network information of User Equipment, UE is provided, comprising: receiving, by a Policy and Charging Enforcement Function (PCEF), a request from a Policy and Charging Rules Function (PCRF), wherein the received request is used for requesting to report the access network information; judging, by the PCEF, whether an access network where the UE is located supports reporting of the access network information or not; and when a judgment result is that the access network where the UE is located does not support the reporting of the access network information, reporting, by the PCEF, to the PCRF, second indication information indicating a failure of reporting the access network information, wherein the PCRF sends the second indication information to an Application Function (AF).

In an example embodiment of the present disclosure, after judging, by the PCEF, whether the access network where the UE is located has support for reporting the access network information or not, further comprising: when the judgment result is that the access network where the UE is located supports the reporting of the access network information or whether the access network where the UE is located supports the reporting of the access network information or not is not able to be judged, sending, by the PCEF, to the access network a request used for requesting to report the access network information; when feedback information fed back by the access network does not comprise the access network information, sending, by the PCEF, to the PCRF third indication information indicating a failure of reporting the access network information, wherein the PCRF sends the third indication information to the AF; and/or, when feedback information fed back by the access network comprises the access network information, sending, by the PCEF, the access network information to the PCRF, wherein the PCRF sends the access network information to the AF.

In an example embodiment of the present disclosure, wherein the PCEF judges whether the access network where the UE is located supports the reporting of the access network information or not according to an Internet Protocol Connectivity Access Network (IP-CAN), type.

According to another aspect of the present disclosure, a method for processing access network information of User Equipment, UE is provided, comprising: receiving, by a Bearer Binding and Event Report Function (BBERF), a request from a Policy and Charging Rules Function (PCRF), wherein the request is used for requesting to report the access network information; sending, by the BBERF, to an access network a request used for requesting to report the access network information; when feedback information fed back by the access network does not comprise the access network information, sending, by the BBERF, to the PCRF, fourth indication information indicating a failure of reporting the access network information, wherein the PCRF sends the fourth indication information to an Application Function (AF); and/or, when feedback information fed back by the access network comprises the access network information, sending, by the BBERF, the access network information to the PCRF, wherein the PCRF sends the access network information to the AF.

According to another aspect of the present disclosure, a method for processing access network information of User Equipment, UE is provided, comprising: sending a request to a Policy and Charging Rules Function (PCRF), wherein the request is used for requesting to report the access network information; and receiving indication information sent by the PCRF, wherein the indication information comprises at least one of: first indication information, determined by the PCRF, indicating that an access network does not support reporting of the access network information, second indication information, determined by a Policy and Charging Enforcement Function (PCEF), indicating that the access network does not support the reporting of the access network information, third indication information, fed back by the access network through the PCEF, indicating that the access network does not support the reporting of the access network information, and fourth indication information, fed back by the access network through a Bearer Binding and Event Report Function (BBERF), indicating that the access network does not support the reporting of the access network information.

According to an aspect of the present disclosure, a device for processing access network information of User Equipment, UE is provided, applied to a Policy and Charging Rules Function (PCRF), comprising: a first receiving component, configured to receive a request from an Application Function (AF), wherein the received request is used for requesting to report the access network information; a first judging component, configured to judge whether an access network where the UE is located supports reporting of the access network information or not; a first feeding back component, configured for the PCRF to, when a judgment result of the first judging component is that the access network where the UE is located does not support the reporting of the access network information, feed back to the AF first indication information indicating a failure of reporting the access network information; a first sending component, configured for the PCRF to, when the judgment result of the first judging component is that the access network where the UE is located supports the reporting of the access network information, or whether the access network where the UE is located supports the reporting of the access network information or not is not able to be judged, send to a Policy and Charging Enforcement Function (PCEF), a request used for requesting to report the access network information; a second receiving component, configured to, when the PCEF determines that the access network where the UE is located does not support the reporting of the access network information, receive second indication information, fed back by the PCEF, indicating a failure of reporting the access network information; and a second sending component, configured to send the received second indication information to the AF.

In an example embodiment of the present disclosure, wherein the first judging component comprises: a first judging element, configured to, when there is one access network where the UE is located, judge whether the access network where the UE is located supports the reporting of the access network information or not; or, a second judging element, configured to, when there are at least two access networks where the UE is located, respectively judge whether an access network, through which each service data stream of a session performed with the AF is transmitted, supports the reporting of the access network information or not.

In an example embodiment of the present disclosure, further comprising: a third receiving component, configured to, when the PCEF determines that the access network where the UE is located supports the reporting of the access network information or the PCEF is not able to judge whether the access network where the UE is located supports the reporting of the access network information or not, and feedback information received by the PCEF does not comprise the access network information after the PCEF sends to the access network a request used for requesting to report the access network information, receive third indication information, sent by the PCEF, indicating a failure of reporting the access network information; and a third sending component, configured to send the received third indication information to the AF.

In an example embodiment of the present disclosure, further comprising: a fourth receiving component, configured to, when the PCEF determines that the access network where the UE is located supports the reporting of the access network information or the PCEF is not able to judge whether the access network where the UE is located supports the reporting of the access network information or not, and feedback information received by the PCEF comprises the access network information after the PCEF sends to the access network a request used for requesting to report the access network information, receive the access network information sent by the PCEF; and a fourth sending component, configured to send the received access network information to the AF.

In an example embodiment of the present disclosure, further comprising: a fifth sending component, configured for the PCRF to, when the judgment result of the first judging component is that the access network where the UE is located supports the reporting of the access network information, or whether the access network where the UE is located supports the reporting of the access network information or not is not able to be judged, send to a Bearer Binding and Event Report Function (BBERF), a request used for requesting to report the access network information; a fifth receiving component, configured to, when feedback information received by the BBERF does not comprise the access network information after the BBERF sends to the access network a request used for requesting to report the access network information, receive fourth indication information, sent by the BBERF, indicating a failure of reporting the access network information; and a sixth sending component, configured to send the received fourth indication information to the AF.

In an example embodiment of the present disclosure, further comprising: a sixth receiving component, configured to, when the feedback information received by the BBERF comprises the access network information after the BBERF sends to the access network a request used for requesting to report the access network information, receive the access network information sent by the BBERF; and a seventh sending component, configured to send the received access network information to the AF.

In an example embodiment of the present disclosure, further comprising: a second judging component, configured to judge whether a network element except the access network in an access system where the UE is located, and/or a network element except the access network in an access system through which each service data stream of a session performed with the AF is transmitted support/supports the reporting of the access network information or not.

In an example embodiment of the present disclosure, wherein the first judging component or the second judging component is further configured to judge whether the access network where the UE is located supports the reporting of the access network information or not according to an Internet Protocol Connectivity Access Network (IP-CAN) type.

According to another aspect of the present disclosure, a Policy and Charging Rules Function (PCRF) is provided, comprising any one of the above devices.

According to another aspect of the present disclosure, a device for processing access network information of User Equipment, UE is provided, applied to a Policy and Charging Enforcement Function (PCEF), comprising: a seventh receiving component, configured to receive a request from a Policy and Charging Rules Function (PCRF), wherein the received request is used for requesting to report the access network information; a third judging component, configured to judge whether an access network where the UE is located supports the reporting of the access network information or not; and a first reporting component, configured for the PCEF to, when a judgment result of the third judging component is that the access network where the UE is located does not support the reporting of the access network information, report, to the PCRF, second indication information indicating a failure of reporting the access network information, wherein the PCRF sends the second indication information to an Application Function (AF).

In an example of the embodiment of the present disclosure, further comprising: an eighth sending component, configured to, when the judgment result of the third judging component is that the access network where the UE is located supports the reporting of the access network information, or whether the access network where the UE is located supports the reporting of the access network information or not is not able to be judged, send to the access network a request used for requesting to report the access network information; a ninth sending component, configured to, when feedback information fed back by the access network does not comprise the access network information, send to the PCRF third indication information indicating a failure of reporting the access network information, wherein the PCRF sends the third indication information to the AF; and/or, a tenth sending component, configured to, when the feedback information fed back by the access network comprises the access network information, send the access network information to the PCRF, wherein the PCRF sends the access network information to the AF.

In an example of the embodiment of the present disclosure, wherein the third judging component is further configured to judge whether the access network where the UE is located supports the reporting of the access network information or not according to an Internet Protocol Connectivity Access Network (IP-CAN), type.

According to another aspect of the present disclosure, a Policy and Charging Enforcement Function (PCEF) is provided, comprising any one of the above devices.

According to another aspect of the present disclosure, a device for processing access network information of User Equipment, UE is provided, applied to a Bearer Binding and Event Report Function (BBERF), comprising: an eighth receiving component, configured to receive a request from a Policy and Charging Rules Function (PCRF), wherein the request is used for requesting to report the access network information; an eleventh sending component, configured to, when feedback information fed back by an access network does not comprise access the network information, send to the PCRF fourth indication information indicating a failure of reporting the access network information, wherein the PCRF sends the fourth indication information to an Application Function (AF); and/or, a twelfth sending component, configured to, when feedback information fed back by an access network comprises the access network information, send the access network information to the PCRF, wherein the PCRF sends the access network information to the AF.

According to another aspect of the present disclosure, a Bearer Binding and Event Report Function (BBERF) is provided, comprising any one of the above devices.

According to another aspect of the present disclosure, a device for processing access network information of User Equipment, UE is provided, applied to an Application Function (AF), comprising: a thirteenth sending component, configured to send a request to a Policy and Charging Rules Function (PCRF), wherein the request is used for requesting to report the access network information; and a ninth receiving component, configured to receive indication information sent by the PCRF, wherein the indication information comprises at least one of: first indication information, determined by the PCRF, indicating that an access network does not support reporting of the access network information, second indication information, determined by a Policy and Charging Enforcement Function (PCEF), indicating that the access network does not support reporting of the access network information, third indication information, fed back by the access network through the PCEF, indicating that the access network does not support the reporting of the access network information, and fourth indication information, fed back by the access network through a Bearer Binding and Event Report Function (BBERF), indicating that the access network does not support the reporting of the access network information.

According to another aspect of the present disclosure, an Application Function (AF) is provided, comprising the above device.

According to the present disclosure, a PCRF receives a request from an AF, wherein the received request is used for requesting to report the access network information; the PCRF judges whether an access network where the UE is located supports reporting the access network information or not; when a judgment result is that the access network where the UE is located does not support reporting of the access network information, the PCRF feeds back to the AF first indication information of a failure of reporting the access network information; and/or, when the judgment result is that the access network where the UE is located supports reporting of the access network information, or whether the access network where the UE is located supports reporting of the access network information or not is not able to be judged, the PCRF sends a request to a PCEF, wherein the sent request is used for requesting to report the access network information; when the PCEF determines that the access network where the UE is located does not support reporting the access network information, the PCRF receives second indication information, fed back by the PCEF, of a failure of reporting the access network information; and the PCRF sends the received second indication information to the AF. The problem of application layer processing error caused by incapability of reporting the access network information or low efficiency of reporting the access network information in the related art is solved, and the effects of accurately feeding back the access network information, greatly improving feedback efficiency and avoiding the application layer processing error are further achieved.

BRIEF DESCRIPTION OF THE DRAWINGS

The drawings described here are adopted to provide further understanding of the present disclosure, and form a part of the present disclosure. Schematic embodiments of the present disclosure and description thereof are adopted to explain the present disclosure and not intended to form improper limits to the present disclosure. In the drawings.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 1:
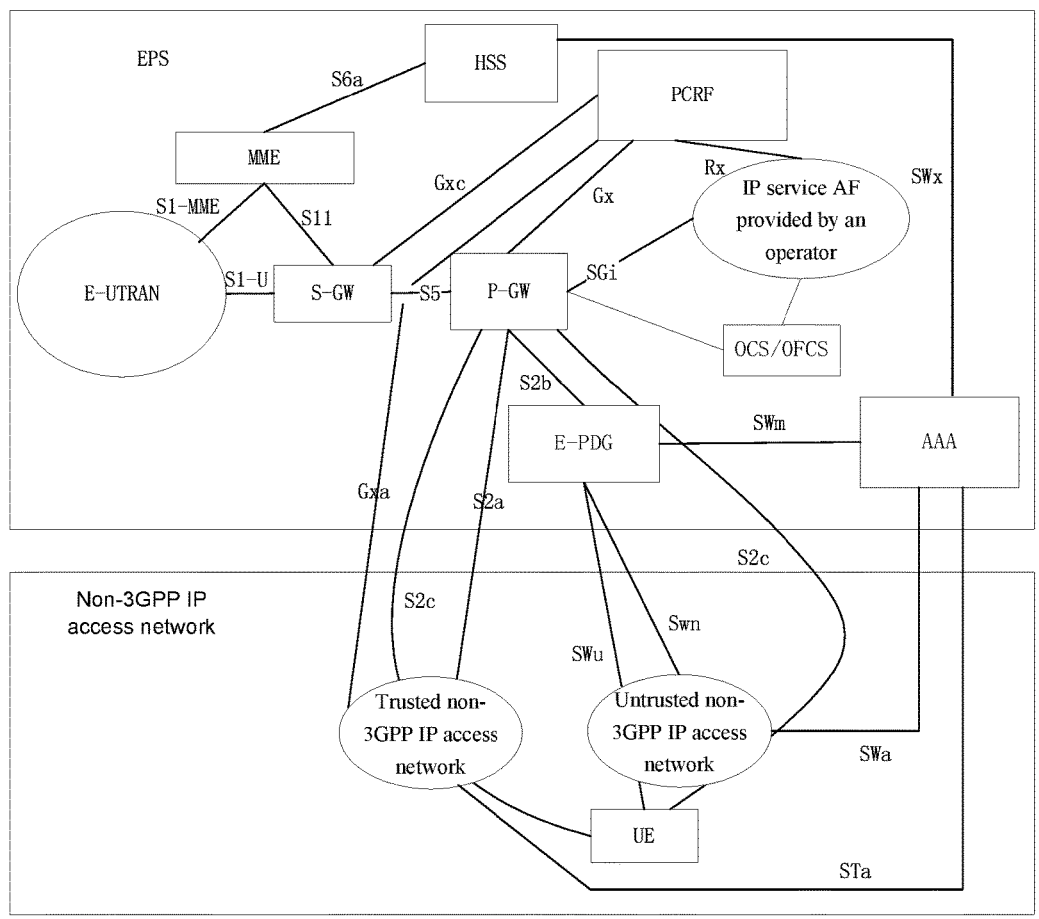
FIG. 1 is a diagram showing an architecture of a PCC defined by the 3GPP according to the related art.
Figure 2:
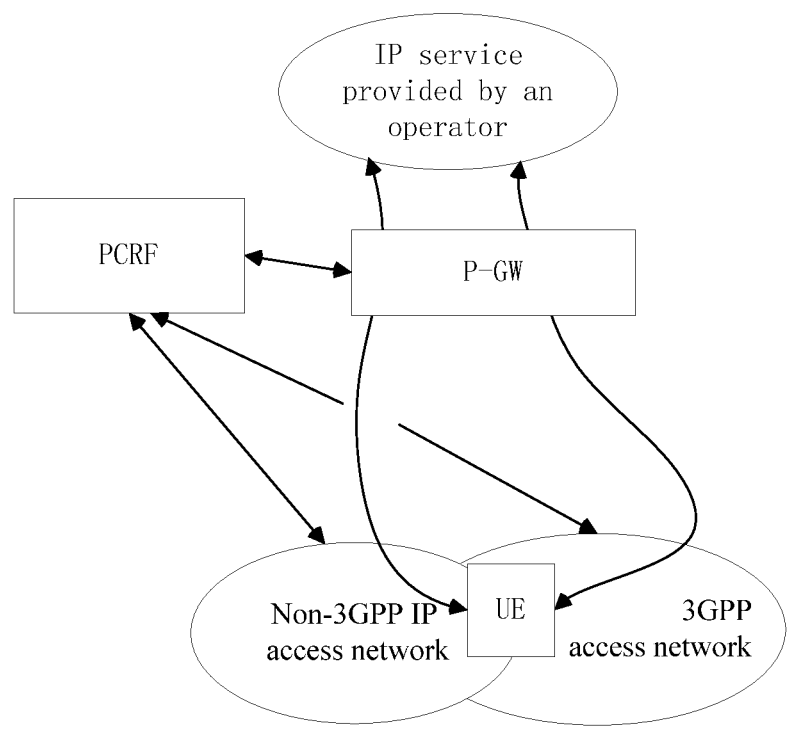
FIG. 2 is a diagram showing IFOM according to the related art.
Figure 3:
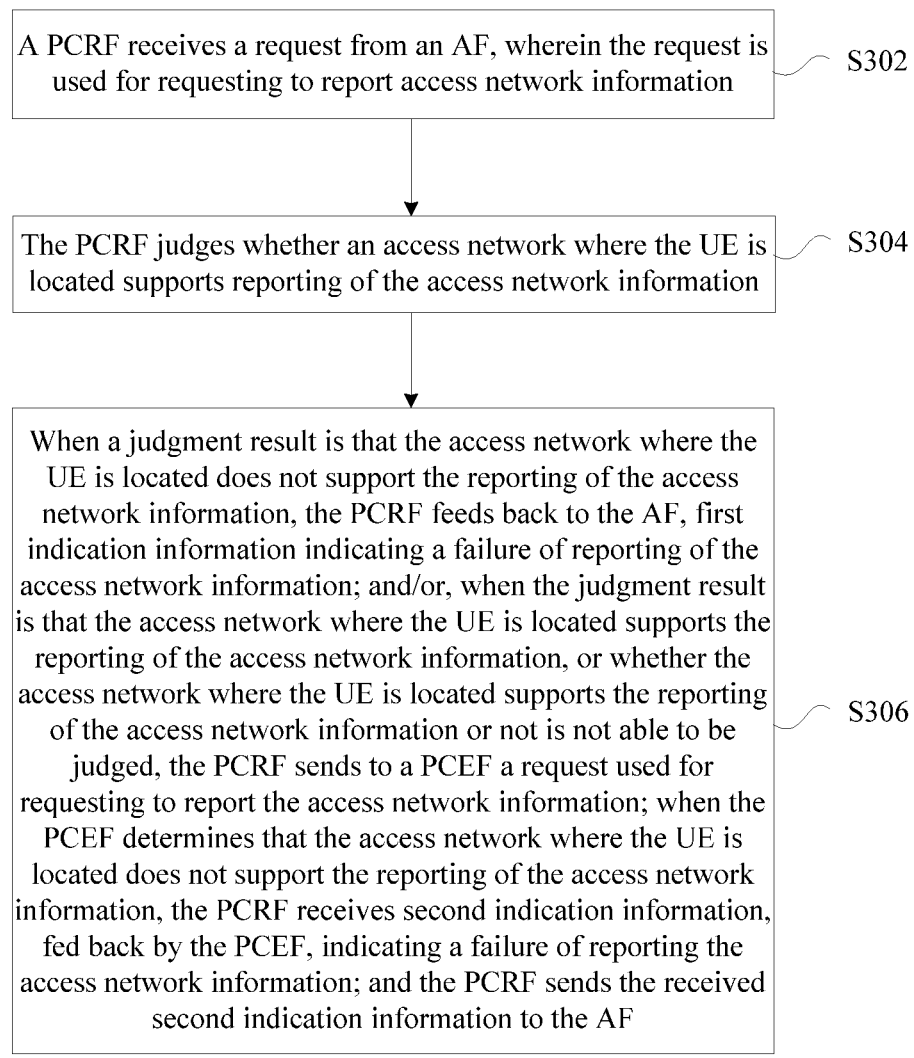
FIG. 3 is a flowchart of a first method for processing the access network information of the UE according to an embodiment of the present disclosure.

The embodiment provides a method for processing access network information of UE. FIG. 3 is a flowchart of a first method for processing the access network information of the UE according to an embodiment of the present disclosure. As shown in FIG. 3, the flow includes the following steps:

Step 302: a PCRF receives a request from an AF, wherein the request is used for requesting to report the access network information;

Step 304: the PCRF judges whether an access network where the UE is located supports reporting of access network information or not;

Step 306: when a judgment result is that the access network where the UE is located supports the reporting of the access network information, the PCRF feeds back, to the AF, first indication information indicating a failure of reporting the access network information; and/or, when the judgment result is that the access network where the UE is located support the reporting of the access network information, or whether the access network where the UE is located supports the reporting of the access network information or not is not able to be judged, the PCRF sends to a PCEF a request used for requesting to report the access network information; when the PCEF determines that the access network where the UE is located does not support the reporting of the access network information, the PCRF receives second indication information, fed back by the PCEF, indicating a failure of reporting the access network information; and the PCRF sends the received second indication information to the AF, wherein the first indication information may adopt multiple forms, and for example, may be at least one of: an error code identifying a failure of reporting the access network information and an identifier of a Public Land Mobile Network (PLMN).

By the steps, the PCRF directly judges whether the access network supports the reporting of the access network information or not at first when receiving the request used for requesting to report the access network information, and feeds back the indication information indicating the failure of reporting the access network information to the AF when the access network does not support the reporting of the access network information, so that the problem of application layer processing error caused by incapability of reporting the access network information or low efficiency of reporting the access network information due to the fact that the PCRF directly transmits the request without judging whether the access network supports the reporting the access network information or not when receiving the request used for requesting to report the access network information and still processes the request used for reporting the access network information when the access network does not support reporting of the access network information in the related art is solved, and the effects of accurately feeding back the access network information, greatly improving feedback efficiency and avoiding the application layer processing error are further achieved.

When the PCRF judges whether the access network where the UE is located supports the reporting the access network information or not, different judgment processing may be adopted according to different access scenarios of the UE. For example, when there is one access network where the UE is located, the PCRF judges whether the access network where the UE is located supports the reporting of the access network information or not, wherein, there is one access network where the UE is located, refers to a condition that the UE accesses the network in a single-access or MAPCON manner; and for another example, when there are at least two access networks where the UE is located, the PCRF respectively judges whether an access network through which each service data stream of a session performed with the AF is transmitted, supports the reporting of the access network information or not, wherein, there are at least two access networks where the UE is located, refers to a condition that the UE accesses the networks in an IFOM manner.

In an example embodiment, after the PCRF judges whether the access network where the UE is located supports the reporting of the access network information reporting or not, the method further includes that: when a judgment result is that the access network where the UE is located supports the reporting of the access network information, or whether the access network where the UE is located supports the reporting of the access network information or not is not able to be judged, the PCRF may judge whether the access network supports the reporting of the access network information or not through different network elements, wherein the different network element may be a PCEF, and may also be a BBERF. Description will be made below with the two network elements as examples.

The PCRF judges whether the access network supports the reporting of the access network information or not through the PCEF.

Under one condition: the PCRF sends to the PCEF a request used for requesting to report the access network information; under the condition that the PCEF determines that the access network where the UE is located does not support the reporting of the access network information, the PCRF receives second indication information, fed back by the PCEF, indicating a failure of reporting the access network information, wherein the second indication information may adopt multiple forms, and for example, the second indication information may also be at least one of: an error code identifying a failure of reporting the access network information and an identifier of a PLMN; and the PCRF sends the received second indication information to the AF. Whether the access network supports reporting of the access network information or not is judged and fed back to the AF through the PCEF, and by such processing, feedback efficiency of reporting the access network information may also be improved to a certain extent.

Under the other condition: under the condition that feedback information received by the PCEF does not include the access network information after the PCEF sends to the access network a request used for requesting to report the access network information, the PCRF receives third indication information, sent by the PCEF, indicating a failure of reporting the access network information, wherein the third indication information may adopt multiple forms, and for example, the third indication information may also be at least one of: a specific action identifying the failure of reporting the access network information and an identifier of a PLMN; and the PCRF sends the received third indication information to the AF. Under the condition that the PCEF determines that the access network where the UE is located supports the reporting of the access network information or whether the access network where the UE is located supports the reporting of the access network information or not is not able to be judged for the PCEF, the method further includes that: under the condition that the feedback information received by the PCEF includes the access network information after the PCEF sends to the access network a request used for requesting to report the access network information, the PCRF receives the access network information sent by the PCEF; and the PCRF sends the received access network information to the AF. By such processing, under the condition that the PCEF determines that the access network where the UE is located supports the reporting of the access network information or whether the access network where the UE is located supports the reporting of the access network information or not is not able to be judged for the PCEF, the PCRF feeds back to the AF an indicator indicating the failure of reporting the access network information when the received feedback information does not include the access network information, and feeds back the received access network information to the AF when the received feedback information includes the access network information.

The PCRF judges whether the access network supports the reporting of the access network information or not through the BBERF.

Under one condition: the PCRF sends to the BBERF a request used for requesting to report the access network information; under the condition that feedback information received by the BBERF does not include the access network information after the BBERF sends to the access network a request used for requesting to report the access network information, the PCRF receives fourth indication information, sent by the BBERF, indicating a failure of reporting the access network information, wherein the fourth indication information may adopt multiple forms, and for example, the fourth indication information may be at least one of: an event trigger identifying the failure of reporting the access network information and an identifier of a PLMN; and the PCRF sends the received fourth indication information to the AF.

Under the other condition: the PCRF sends to the BBERF a request used for requesting to report the access network information; under the condition that the feedback information received by the BBERF includes the access network information after the BBERF sends to the access network a request used for requesting to report the access network information, the PCRF receives the access network information sent by the BBERF; and the PCRF sends the received access network information to the AF.

It is important to note that the feedback information carries a corresponding rule name of the feedback information when being fed back to the PCRF by the PCEF or the BBERF under the condition that there are at least two access systems where the UE is located, and the corresponding rule name corresponds to the reporting feedback of the access network information corresponding to each access network accessed by the UE respectively. The feedback information also carries a stream identifier corresponding to the feedback information when being fed back to the AF by the PCRF, that is, different stream identifiers are adopted to identify the access network information corresponding to multiple access networks accessed by the UE. Moreover, when the corresponding rule name is adopted for the feedback information sent to the PCRF by the PCEF or the BBERF and the stream identifier is adopted for the feedback information sent to the AF by the PCRF, there is a certain mapping relationship between the corresponding rule name of the feedback information and stream identifier of the feedback information, and one mapping relationship indicates the access network information corresponding to the same access network.

Judgment about whether the access network supports the reporting of the access network information or not is described above, and preferably, after the PCRF receives from the AF a request used for requesting to report the access network information, the PCRF may further judge whether a network element except the access network in an access system where the UE is located and/or a network element except the access network in an access system through which each service data stream of the session performed with the AF is transmitted support/supports the reporting of the access network information or not. That is, besides judgment about whether the access network supports the reporting of the access network information or not, whether the other network element related to the reporting of the access network information in the access system supports the reporting of the access network information or not is also judged, thereby judging whether the whole access system supports the reporting of the access network information or not.

It is important to note that the PCRF may judge whether the access network supports the reporting of the access network information or not in multiple manners, and for example, may judge whether the access network where the UE is located supports the reporting of the access network information or not according to an type of an IP-CAN, may also judge whether the access network where the UE is located supports the reporting of the access network information or not according to the type of the IP-CAN type and a type of the RAT, and may further judge whether the access network where the UE is located supports the reporting of the access network information or not according to the type of the RAT and trusted/untrusted indication information.

Figure 4:
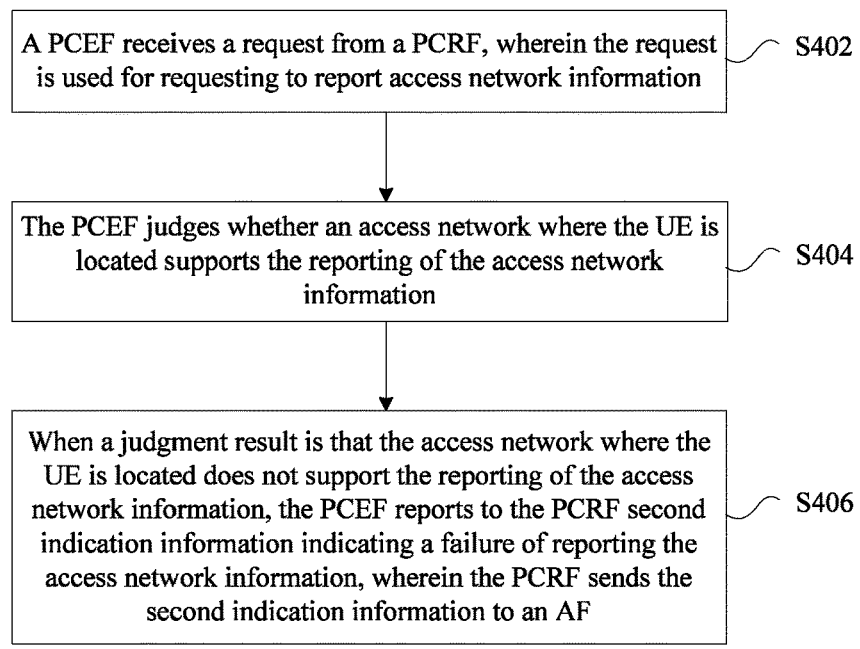
FIG. 4 is a flowchart of a second method for processing the access network information of the UE according to an embodiment of the present disclosure.

According to another aspect of the present disclosure, a method for processing access network information of UE is provided. FIG. 4 is a flowchart of a second method for processing the access network information of the UE according to an embodiment of the present disclosure. As shown in FIG. 4, the flow includes the following steps:

Step 402: a PCEF receives from a PCRF a request used for requesting to report access network information;

Step 404: the PCEF judges whether an access network where the UE is located supports the reporting of the access network information or not; and Step 406: under the condition that a judgment result is that the access network where the UE is located does not support the reporting of the access network information, the PCEF reports to the PCRF second indication information indicating a failure of reporting of the access network information, wherein the PCRF sends the second indication information to an AF.

By the steps, the PCEF judges whether the access network where the UE is located supports the reporting of the access network information or not, the PCEF directly gives feedback to the PCRF when determining that the access network does not support the reporting of the access network information, and then the PCRF directly gives feedback to the AF, so that the problem of application layer processing error caused by incapability of reporting access network information or low efficiency of reporting the access network information due to the fact that the PCRF directly transmits the request to the PCEF when receiving the request used for requesting to report the access network information and the PCEF does not judge whether the access network supports the reporting of the access network information or not and still processes the request for requesting to report the access network information when the access network does not support the reporting of the access network information in the related art is solved, and the effects of accurately feeding back the access network information, greatly improving feedback efficiency and avoiding the application layer processing error are further achieved.

On the other hand, after the PCEF judges whether the access network where the UE is located supports the reporting of the access network information or not, the method further includes that: under the condition that the judgment result is that the access network where the UE is located supports the reporting of the access network information, or whether the access network where the UE is located supports the reporting of the access network information is not able to be judged by the PCEF, the PCEF sends to the access network a request used for requesting to report the access network information; under the condition that feedback information fed back by the access network does not include the access network information, the PCEF sends to the PCRF third indication information indicating a failure of reporting the access network information, wherein the PCRF sends the third indication information to the AF; and/or, under the condition that the feedback information fed back by the access network includes the access network information, the PCEF sends the access network information to the PCRF, wherein the PCRF sends the access network information to the AF.

The similarity with the PCRF is that the PCEF may also judge whether the access network supports the reporting of the access network information or not in multiple manners, and for example, the PCEF may also judges whether the access network where the UE is located supports the reporting of the access network information reporting or not according to an IP-CAN type.

Figure 5:
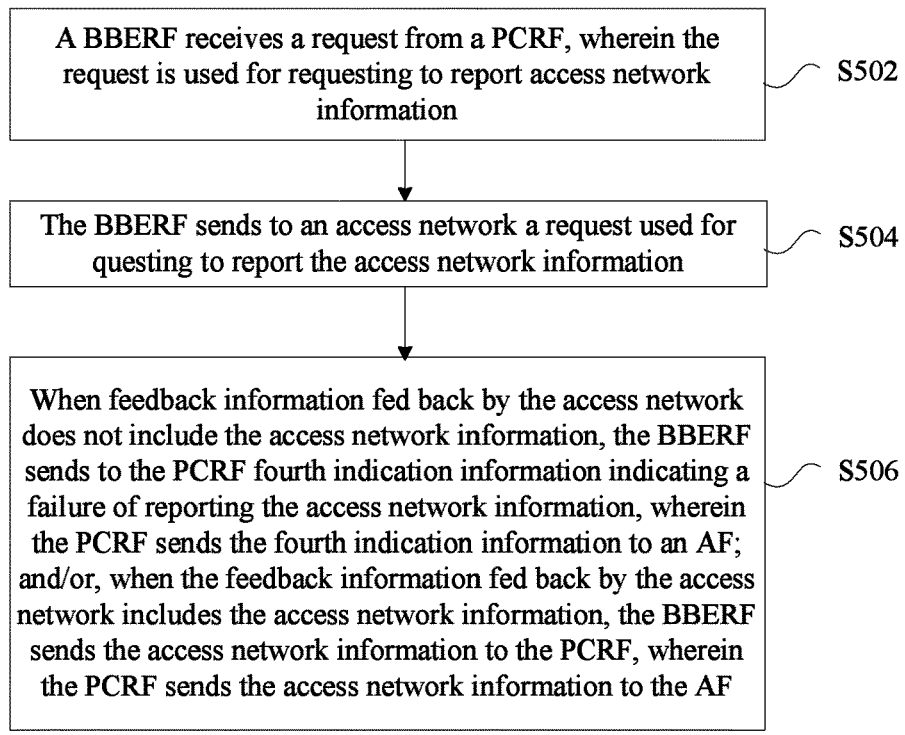
FIG. 5 is a flowchart of a third method for processing access network information of the UE according to an embodiment of the present disclosure.

The embodiment further provides a method for processing access network information of the UE. FIG. 5 is a flowchart of a third method for processing access network information of the UE according to an embodiment of the present disclosure. As shown in FIG. 5, the flow includes the following steps:

Step 502: a BBERF receives from a PCRF a request used for requesting to report access network information;

Step 504: the BBERF sends to an access network a request used for requesting to report the access network information;

Step 506: under the condition that feedback information fed back by the access network does not include access network information, the BBERF sends to the PCRF fourth indication information indicating a failure of reporting of the access network information, wherein the PCRF sends the fourth indication information to an AF; and/or, under the condition that the feedback information fed back by the access network includes the access network information, the BBERF sends the access network information to the PCRF, wherein the PCRF sends the access network information to the AF.

By the steps, the BBERF judges whether the access network where the UE is located supports the reporting of the access network information or not, the BBERF directly feeds back whether the access network supports the reporting of the access network information or not to the PCRF when determining that the access network does not support the reporting of the access network information, and then the PCRF directly gives feedback to the AF, so that the problem of application layer processing error caused by incapability of reporting access network information or low efficiency of reporting the access network information due to the fact that the PCRF directly transmits the request to the next-layer network without processing of the related network element when receiving the request used for requesting to report the access network information and still processes the request used for requesting to report the access network information when the access network does not support the reporting of the access network information in the related art is solved, and the effects of accurately feeding back the access network information, greatly improving feedback efficiency and avoiding the application layer processing error are further achieved.

Figure 6:
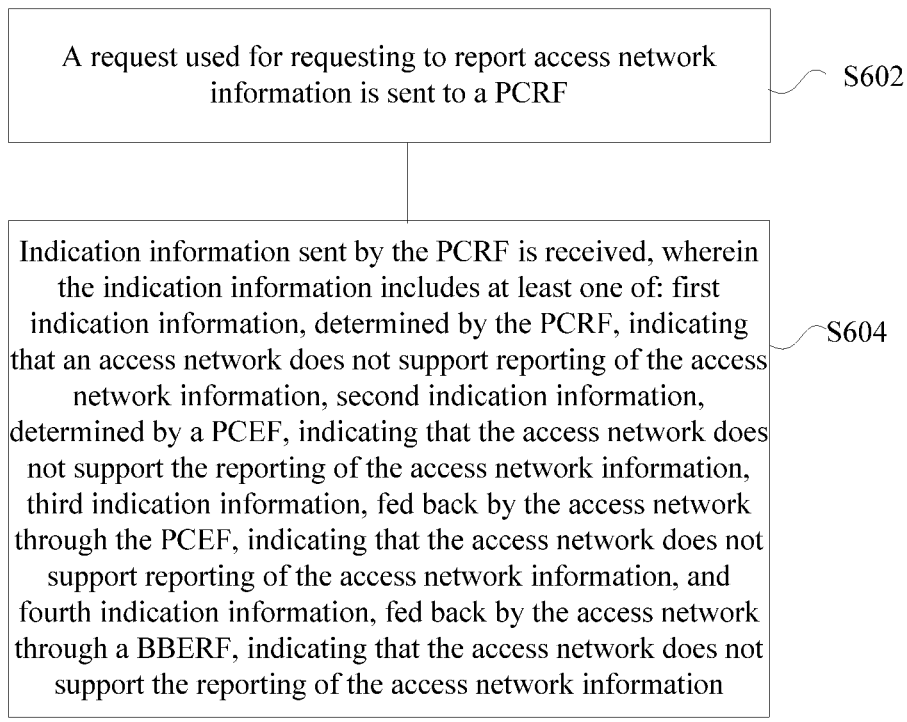
FIG. 6 is a flowchart of a fourth method for processing the access network information of the UE according to an embodiment of the present disclosure.

The embodiment provides a method for processing access network information of the UE. FIG. 6 is a flowchart of a fourth method for processing the access network information of the UE according to an embodiment of the present disclosure. As shown in FIG. 6, the flow includes the following steps:

Step 602: a request used requesting to report access network information is sent to a PCRF; and Step 604: indication information sent by the PCRF is received, wherein the indication information includes at least one of: first indication information, determined by the PCRF, indicating that an access network does not support reporting of the access network information, second indication information, determined by a PCEF, indicating that the access network does not support the reporting of the access network information, third indication information, fed back by the access network through the PCEF, indicating that the access network does not support the reporting of the access network information, and fourth indication information, fed back by the access network through a BBERF, indicating that the access network does not support the reporting of the access network information.

By the steps, the AF directly receives a judgment result of each network element in an access system indicating whether the access network supports the reporting of the access network information or not, so that the problem of application layer processing error caused by incapability of reporting access network information or low efficiency of reporting the access network information due to the fact that there is no judgment processing of the related network element about whether the access network supports the reporting of the access network information or not involved after the AF transmits the request used for requesting to report the access network information to the next layer and it is obtained that the access network does not support the reporting of the access network information only when no required access network information is received after specific access network processing is implemented in the related art is solved, and the effects of accurately feeding back the access network information, greatly improving feedback efficiency and avoiding the application layer processing error are further achieved.

The embodiment further provides a device for processing access network information of UE. The device is configured to implement the abovementioned embodiment and preferred implementation modes, and that what has been described will not be elaborated. For example, term "component", used below, is a combination of software and/or hardware capable of realizing a preset function. The device described in the following embodiment is preferably implemented by software, but implementation of the device with hardware or the combination of software and hardware is also possible and conceived.

Figure 7:
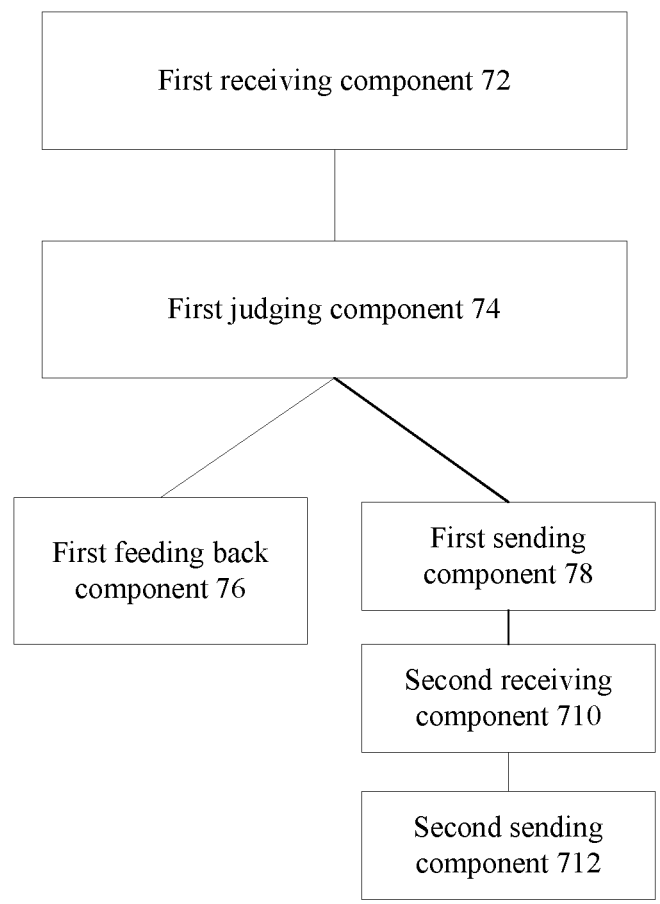
FIG. 7 is a structure diagram of a first device for processing access network information of the UE according to an embodiment of the present disclosure.

FIG. 7 is a structure diagram of a first device for processing access network information of the UE according to an embodiment of the present disclosure. As shown in FIG. 7, the device is applied to a PCRF, and includes a first receiving component 72, a first judging component 74, a first feeding back component 76, a first sending component 78, a second receiving component 710 and a second sending component 712. The first device will be described below.

The first receiving component 72 is configured to receive a request from an AF, wherein the request is used for requesting to report the access network information; the first judging component 74 is connected to the first receiving component 72, and is configured to judge whether an access network where the UE is located supports the reporting of the access network information or not; the first feeding back component 76 is connected to the first judging component 74, and is configured for the PCRF to, when a judgment result of the first judging component is that the access network where the UE is located does not support the reporting of the access network information, feed back to the AF, first indication information indicating a failure of reporting the access network information; the first sending component 78 is connected to the first judging component 74, and is configured for the PCRF to, when the judgment result of the first judging component 74 is that the access network where the UE is located supports the reporting of the access network information, or whether the access network where the UE is located supports the reporting of the access network information or not is not able to be judged, send to a PCEF a request used for requesting to report the access network information; the second receiving component 710 is connected to the first sending component 78, and is configured to, when the PCEF determines that the access network where the UE is located does not support the reporting of the access network information, receive second indication information, fed back by the PCEF, indicating a failure of reporting the access network information; and the second sending component 712 is connected to the second receiving component 710, and is configured to send the received second indication information to the AF.

Figure 8:
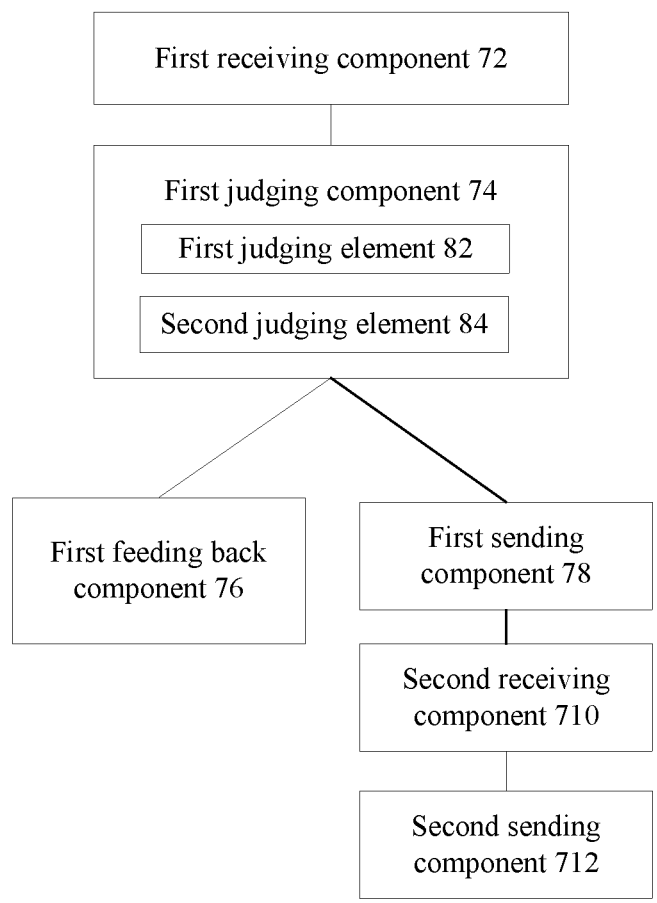
FIG. 8 is an example structure diagram of a first judging component 74 in the first device for processing the access network information of the UE according to an embodiment of the present disclosure.

FIG. 8 is an example structure diagram of a first judging component 74 in the first device for processing the access network information of the UE according to an embodiment of the present disclosure. As shown in FIG. 8, the first judging component 74 includes a first judging element 82 or a second judging element 84. The first judging component 72 will be described below.

The first judging element 82 is configured to, when there is one access network where the UE is located, judge whether the access network where the UE is located supports the reporting of the access network information or not; or, the second judging element 84 is configured to, when there are at least two access networks where the UE is located, respectively judge whether an access network through which each service data stream of a session performed with the AF is transmitted, supports the reporting of the access network information or not.

Figure 9:
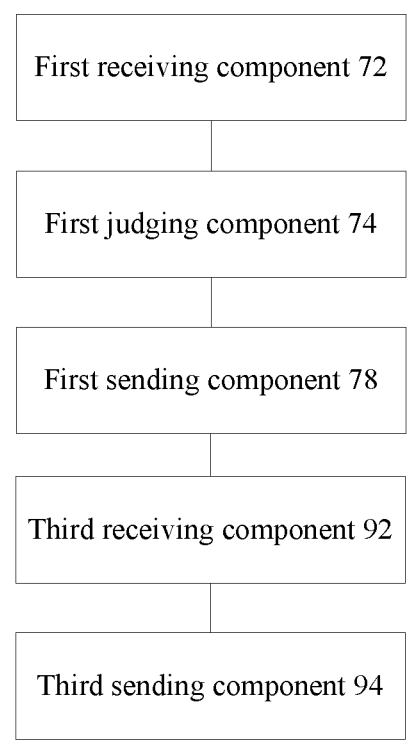
FIG. 9 is a second example structure diagram of the first device for processing the access network information of the UE according to an embodiment of the present disclosure.

FIG. 9 is a second example structure diagram of the first device for processing the access network information of the UE according to an embodiment of the present disclosure. As shown in FIG. 9, the device further, besides the first receiving component 72, first judging component 74 and first sending component 78 shown in FIG. 7, includes a third receiving component 92 and a third sending component 94. The second example structure of the first device will be described below.

The third receiving component 92 is connected to the first sending component 78, and is configured to, when the PCEF determines that the access network where the UE is located supports the reporting of the access network information or the PCEF is not able to judge whether the access network where the UE is located supports the reporting of the access network information or not and feedback information received by the PCEF does not include access network information after the PCEF sends to the access network a request used for requesting to report the access network information, receive third indication information, sent by the PCEF, indicating a failure of reporting the access network information; and the third sending component 94 is connected to the third receiving component 92, and is configured to send the received third indication information to the AF.

Figure 10:
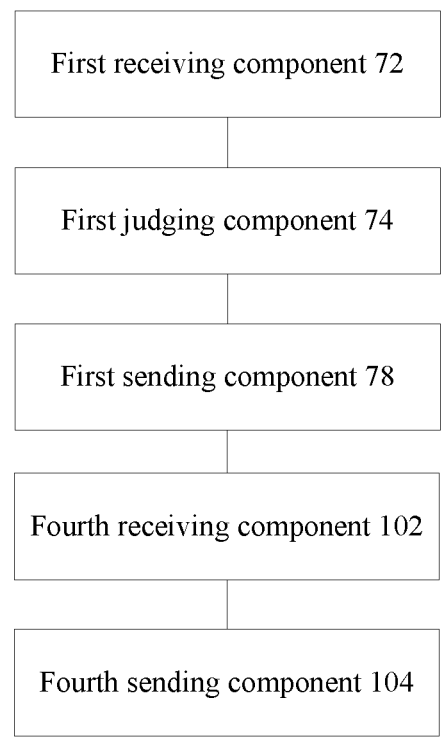
FIG. 10 is a third example structure diagram of the first device for processing the access network information of the UE according to an embodiment of the present disclosure.

FIG. 10 is a third example structure diagram of the first device for processing the access network information of the UE according to an embodiment of the present disclosure. As shown in FIG. 10, the device further, besides the first receiving component 72, first judging component 74 and first sending component 78 shown in FIG. 7, includes a fourth receiving component 102 and a fourth sending component 104. The third example structure of the first device will be described below.

The fourth receiving component 102 is connected to the first sending component 78, and is configured to, when the PCEF determines that the access network where the UE is located supports the reporting of the access network information or the PCEF is not able to judge whether the access network where the UE is located supports the reporting of the access network information or not and the feedback information received by the PCEF includes the access network information after the PCEF sends to the access network the request used for requesting to report the access network information, receive the access network information sent by the PCEF; and the fourth sending component 104 is connected to the fourth receiving component 102, and is configured to send the received access network information to the AF.

Figure 11:
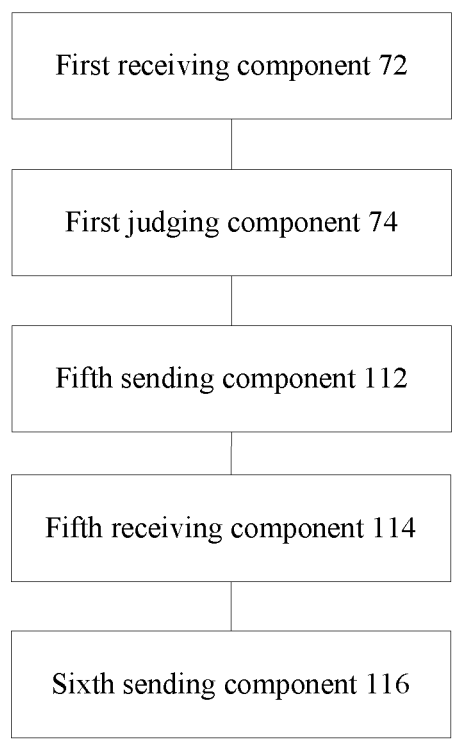
FIG. 11 is a fourth example structure diagram of the first device for processing the access network information of the UE according to an embodiment of the present disclosure.

FIG. 11 is a fourth example structure diagram of the first device for processing the access network information of the UE according to an embodiment of the present disclosure. As shown in FIG. 11, the device further, besides the first receiving component 72 and first judging component 74 shown in FIG. 7, includes a fifth sending component 112, a fifth receiving component 114 and a sixth sending component 116. The fourth example structure of the first device will be described below.

The fifth sending component 112 is connected to the first judging component 74, and is configured for the PCRF to, when the judgment result of the first judging component 74 is that the access network where the UE is located supports the reporting of the access network information, or whether the access network where the UE is located supports the reporting of the access network information or not is not able to be judged, send to a BBERF a request used for requesting to report the access network information; the fifth receiving component 114 is connected to the fifth sending component 112, and is configured to, when feedback information received by the BBERF does not include the access network information after the BBERF sends to the access network a request used for requesting to report the access network information, receive fourth indication information, sent by the BBERF, indicating a failure of reporting the access network information; and the sixth sending component 116 is connected to the fifth receiving component 114, and is configured to send the received fourth indication information to the AF.

Figure 12:
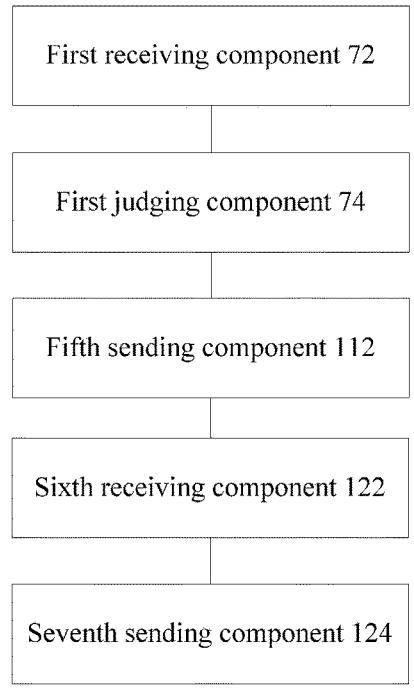
FIG. 12 is a fifth example structure diagram of the first device for processing the access network information of the UE according to an embodiment of the present disclosure.

FIG. 12 is a fifth example structure diagram of the first device for processing the access network information of the UE according to an embodiment of the present disclosure. As shown in FIG. 12, the device further, besides the first receiving component 72 and first judging component 74 shown in FIG. 7 and the fifth sending component 112 shown in FIG. 11, includes a sixth receiving component 122 and a seventh sending component 124. The fifth example structure of the first device will be described below.

The sixth receiving component 122 is connected to the fifth sending component 111, and is configured to, when the feedback information received by the BBERF includes the access network information after the BBERF sends to the access network a request used for requesting to report the access network information, receive the access network information sent by the BBERF; and the seventh sending component 124 is connected to the sixth receiving component 122, and is configured to send the received access network information to the AF.

Figure 13:
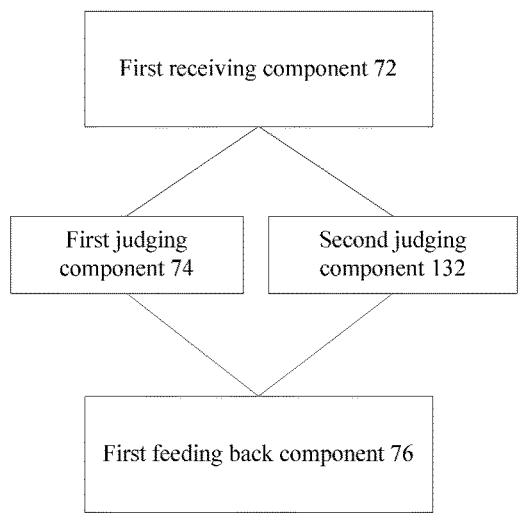
FIG. 13 is a sixth example structure diagram of the first device for processing the access network information of the UE according to an embodiment of the present disclosure.

FIG. 13 is a sixth example structure diagram of the first device for processing the access network information of the UE according to an embodiment of the present disclosure. As shown in FIG. 13, the device further, besides the first receiving component 72, first judging component 74 and first feeding back component 76 shown in FIG. 7, includes a second judging component 132. The second judging component 132 will be described below.

The second judging component 132 is connected to the first receiving component 72 and the first feeding back component 76, and is configured to judge whether a network element except the access network in an access system where the UE is located, and/or a network element except the access network in an access system through which each service data stream of a session performed with the AF is transmitted support/supports the reporting of the access network information or not. Preferably, the first feeding back component 76 is further configured to feed back a judgment result of the second judging component 132 to the AF.

In an example embodiment, the first judging component 74 is further configured to judge whether the access network where the UE is located supports the reporting of the access network information or not according to an IP-CAN type.

Figure 14:
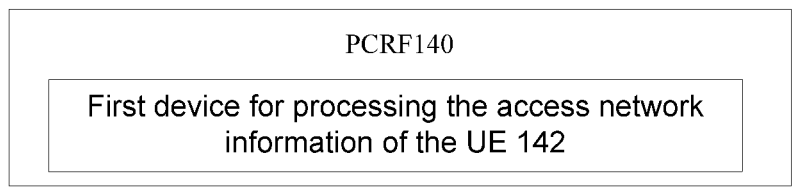
FIG. 14 is a structure diagram of a PCRF according to an embodiment of the present disclosure.

FIG. 14 is a structure diagram of a PCRF according to an embodiment of the present disclosure. As shown in FIG. 14, the PCRF 140 includes the first device for processing the access network information of the UE 142 in any one of the abovementioned items.

Figure 15:
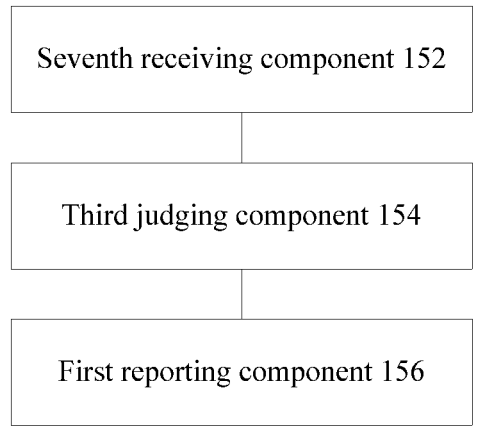
FIG. 15 is an example structure diagram of a second device for processing the access network information of the UE according to an embodiment of the present disclosure.

FIG. 15 is an example structure diagram of a second device for processing the access network information of the UE according to an embodiment of the present disclosure. As shown in FIG. 15, the device is applied to a PCEF, and includes a seventh receiving component 152, a third judging component 154 and a first reporting component 156. The second device will be described below.

The seventh receiving component 152 is configured to receive a request from a Policy and Charging Rules Function (PCRF), wherein the received request is used for requesting to report the access network information; the third judging component 154 is connected to the seventh receiving component 152, and is configured to judge whether an access network where the UE is located supports the reporting of the access network information or not; and the first reporting component 156 is connected to the third judging component 154, and is configured for the PCEF to, when a judgment result of the third judging component is that the access network where the UE is located does not support the reporting of the access network information, report to the PCRF second indication information indicating a failure of reporting of the access network information, wherein the PCRF sends the second indication information to an AF.

Figure 16:
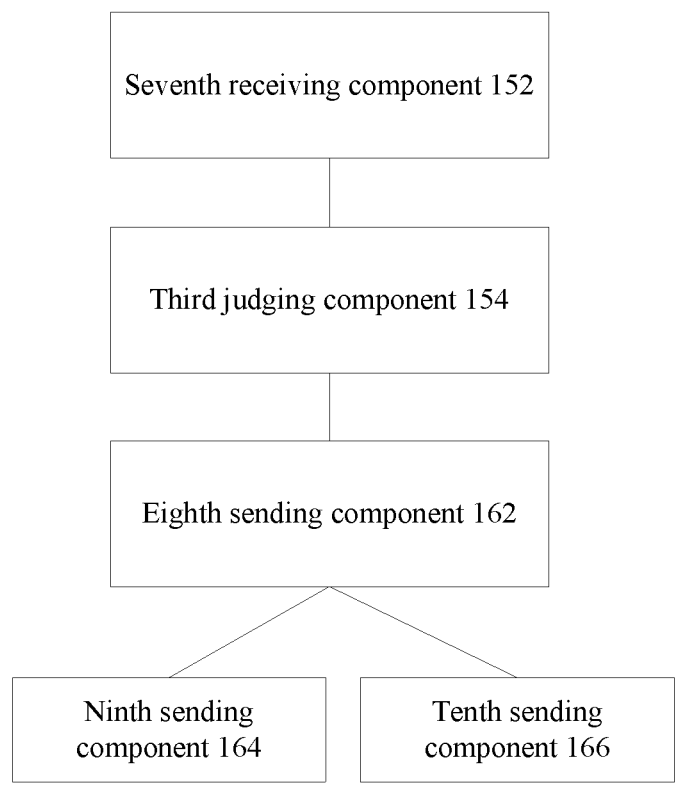
FIG. 16 is a first example structure diagram of a second device for processing the access network information of the UE according to an embodiment of the present disclosure.

FIG. 16 is a first example structure diagram of a second device for processing the access network information of the UE according to an embodiment of the present disclosure. As shown in FIG. 16, the device further, besides the seventh receiving component 152 and third judging component 154 shown in FIG. 15, includes an eighth sending component 162, a ninth sending component 164 and/or a tenth sending component 166. The first example structure of the second device will be described below.

The eighth sending component 162 is connected to the third judging component 154, and is configured to, when the judgment result of the third judging component 154 is that the access network where the UE is located supports the reporting of the access network information, or whether the access network where the UE is located supports the reporting of the access network information or not is not able to be judged, send to the access network a request used for requesting to report the access network information; the ninth sending component 164 is connected to the eighth sending component 162, and is configured to, when feedback information fed back by the access network does not include the access network information, send to the PCRF third indication information indicating a failure of the reporting the access network information, wherein the PCRF sends the third indication information to the AF; and/or, the tenth sending component 166 is connected to the eighth sending component 162, and is configured to, when the feedback information fed back by the access network includes the access network information, send the access network information to the PCRF, wherein the PCRF sends the access network information to the AF.

In an example embodiment, the third judging component is further configured to judge whether the access network where the UE is located supports the reporting of the access network information or not according to an IP-CAN type.

Figure 17:
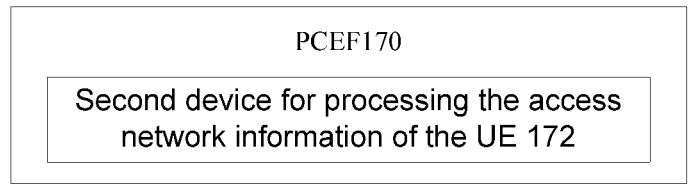
FIG. 17 is a structure diagram of a PCEF according to an embodiment of the present disclosure.

FIG. 17 is a structure diagram of a PCEF according to an embodiment of the present disclosure. As shown in FIG. 17, the PCEF 170 includes the second device for processing the access network information of the UE 172 in any one of the abovementioned items.

Figure 18:
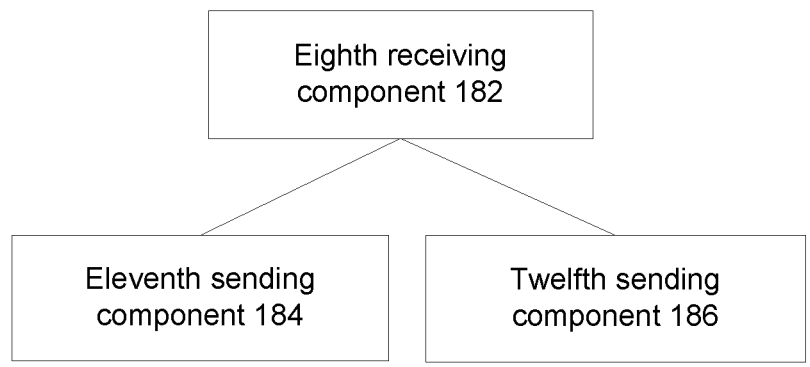
FIG. 18 is a structure diagram of a third device for processing the access network information of the UE according to an embodiment of the present disclosure.

FIG. 18 is a structure diagram of a third device for processing the access network information of the UE according to an embodiment of the present disclosure. As shown in FIG. 18, the device is applied to a BBERF, and includes an eighth receiving component 182, an eleventh sending component 184 and/or a twelfth sending component 186. The third device will be described below.

The eighth receiving component 182 is configured to receive request from a PCRF, wherein the request is used for requesting to report the access network information; the eleventh sending component 184 is connected to the eighth receiving component 182, and is configured to, when feedback information fed back by an access network does not include the access network information, send to the PCRF fourth indication information indicating a failure of reporting the access network information, wherein the PCRF sends the fourth indication information to an AF; and/or, the twelfth sending component 186 is connected to the eighth receiving component 182, and is configured to, when the feedback information fed back by the access network includes the access network information, send the access network information to the PCRF, wherein the PCRF sends the access network information to the AF.

Figure 19:
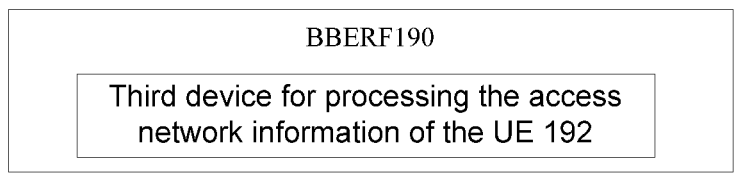
FIG. 19 is a structure diagram of a BBERF according to an embodiment of the present disclosure.

FIG. 19 is a structure diagram of a BBERF according to an embodiment of the present disclosure. As shown in FIG. 19, the BBERF 190 includes the third device for processing the access network information of the UE 192.

Figure 20:
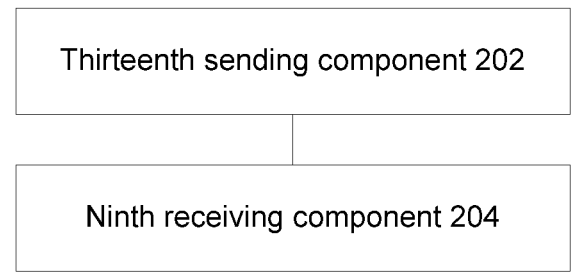
FIG. 20 is a structure diagram of a fourth device for processing the access network information according to an embodiment of the present disclosure.

FIG. 20 is a structure diagram of a fourth device for processing the access network information according to an embodiment of the present disclosure. As shown in FIG. 20, the device is applied to an AF, and includes a thirteenth sending component 202 and a ninth receiving component 204. The fourth device will be described below.

The thirteenth sending component 202 is configured to send a request to a PCRF, wherein the request is used for requesting to report the access network information; and the ninth receiving component 204 is connected to the thirteenth sending component 202, and is configured to receive indication information sent by the PCRF, wherein the indication information includes at least one of: first indication information, determined by the PCRF, indicating that an access network does not support reporting of the access network information reporting, second indication information, determined by a PCEF, indicating that the access network does not support the reporting of the access network information, third indication information, fed back by the access network through the PCEF, indicating that the access network does not support reporting of the access network information, and fourth indication information, fed back by the access network through a BBERF, indicating that the access network does not support the reporting the access network information.

Figure 21:
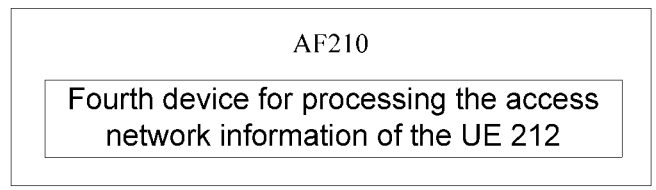
FIG. 21 is a structure diagram of an AF according to an embodiment of the present disclosure.

FIG. 21 is a structure diagram of an AF according to an embodiment of the present disclosure. As shown in FIG. 21, the AF 210 includes the fourth access network information processing device 212 for the UE.

For the problem of incapability of reporting access network information or low efficiency of reporting the access network information in the related art, the embodiment provides a processing method for providing access network information of UE by a network. By the method, the access network information may be accurately fed back, and an application layer processing error may be avoided. The embodiment of the present disclosure will be described below in different scenarios.

Single-Access Scenario:

a PCRF/PCEF judges whether a current access network supports reporting of access network information or not after receiving a request from an AF, where the request is used for requesting to report the access network information. When a judgment result is that the current access network does not support the reporting of the access network information, the PCRF/PCEF returns a negative message to the AF; and when the judgment result is that the current access network supports the reporting of the access network information, the PCRF/PCEF sends to the current access network a request used for requesting to report the access network information.

Multi-Access Scenario:

a PCRF/PCEF judges whether an access network where a service data flow is transmitted supports the reporting of the access network information or not after receiving from the AF a request used for requesting to report the access network information. When a judgment result is that the access network where the service data flow is transmitted does not support the reporting of the access network information, the PCRF/PCEF returns a negative message to the AF; and when the judgment result is that the access network where the service data flow is transmitted supports the reporting of access network information, the PCRF/PCEF sends to the access network where the service data flow is transmitted a request used for requesting to report the access network information; and then the PCRF reports the access network information and a service flow identifier to the AF.

Preferred implementation of the present disclosure will be described below with reference to the drawings.

First Preferred Implementation

Figure 22:
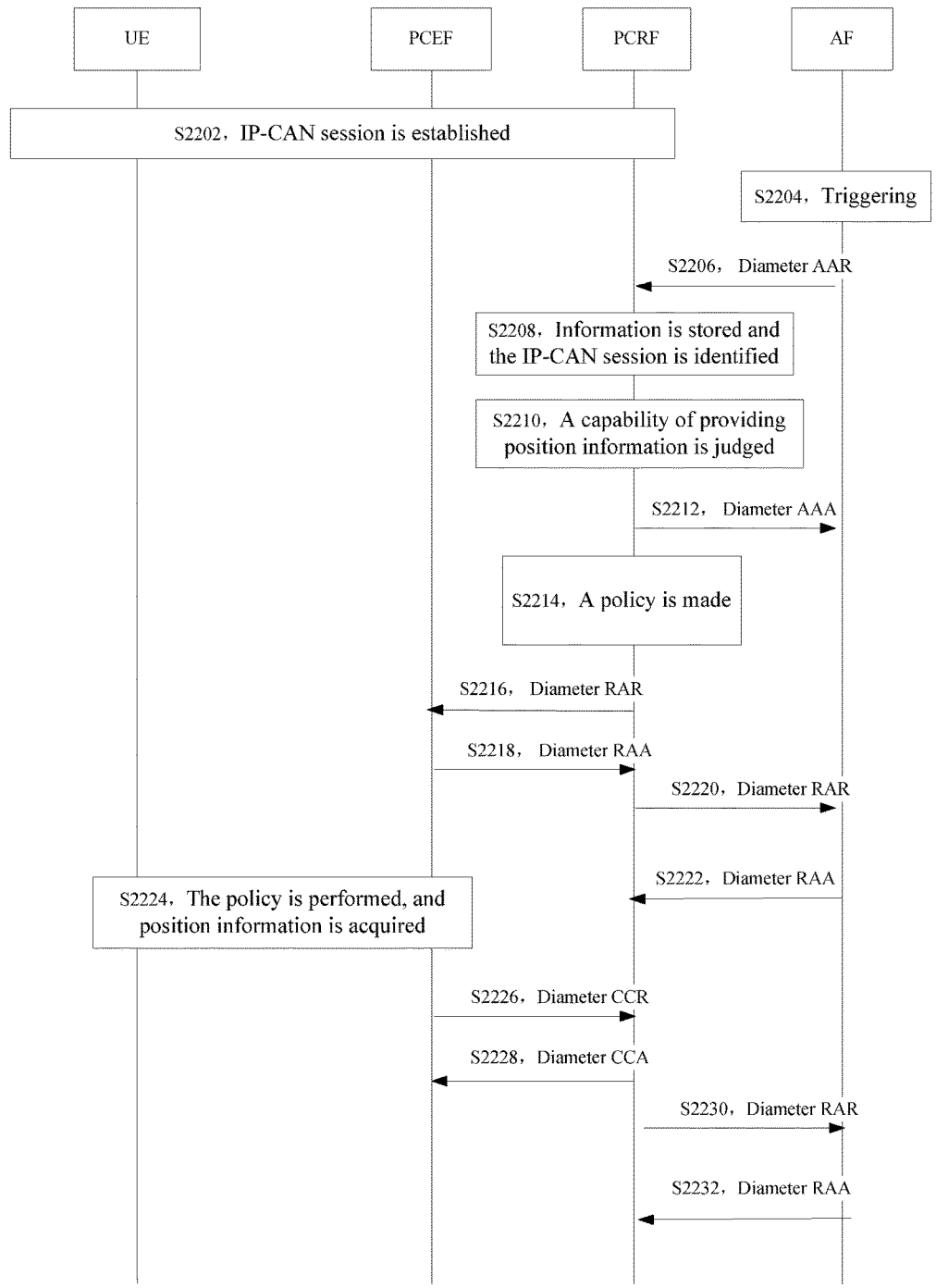
FIG. 22 is a flowchart of a first preferred implementation mode according to the present disclosure.

In the present preferred implementation, a flow of providing access network information according to a PCC rule in absence of a BBERF in a single-access or MAPCON scenario is described. FIG. 22 is a flowchart of a first preferred implementation mode according to the present disclosure, and as shown in FIG. 22, the flow includes the following steps.

Step 2202: UE is attached to a network and initiates an attachment flow, or the UE initiates another PDN connection establishment flow. An IP-CAN session is established, and a PCEF establishes a Gx session with a PCRF. Then the PCRF may have obtained the type of the IP-CAN session, the type of an RAT and whether the PCEF supports the reporting of access network information or not (a value of a set NetLoc of a supported-feature AVP). The PCRF may further acquire an identifier of a PLMN accessed by the UE.

Step 2204: an AF receives a triggering message needing to initially provide service information for the PCRF and request the PCRF to report access network information (i.e. current position information of the UE) (that is, a session of the AF is established); or an AF receives a triggering message needing to update the service information and request the PCRF to report access network information (that is, a session of the AF is modified).

Step 2206: the AF provides the service information for the PCRF or updates the service information, and simultaneously requests to report the access network information reporting. Specifically, the AF sends an AA-Request (AAR) message to the PCRF, and a request used for requesting to report the access network information is carried by a Required-Access-Info AVP. The AF may also not provide any service information, and only request to report the access network information.

Step 2208: the PCRF stores related information. If the AF initially provides the service information for the PCRF (that is, the session of the AF is established), the PCRF performs session binding according to information (an IP address of the UE, user identifier, PDN identifier and the like) carried in the AAR message, namely associates the session of the AF with the IP-CAN session established in Step 2202.

Step 2210: the PCRF judges whether a current access system of the UE supports the reporting of the access network information or not according to a session binding result. Whether the current access system supports the reporting of the access network information or not includes two parts: whether an access network supports the reporting of the access network information or not (the PCRF judges whether the access network supports the reporting of the access network information or not according to one of the obtained following information: the type of the IP-CAN, the type of the IP-CAN and the type of the RAT, the type of the RAT and trusted/untrusted indication information of a WLAN; and for a Trusted Wireless Local Network (TWAN), judgment may further be made according to an identifier of the TWAN) and whether the PCEF supports the reporting the access network information or not. For example, the PCRF may obtain that the type of the current IP-CAN is a 3GPP-General Packet Radio Service (3GPP-GPRS) or a 3GPP-Evolved Packet System (3GPP-EPS) and the PCEF indicates that the PCEF supports the reporting of the access network information, and then the PCRF determines that access network information reporting may be provided. When the obtained type of the IP-CAN by the PCRF is a non-3GPP EPS or the PCEF indicates that the PCEF does not support the reporting of the access network information, the PCRF determines that the PCRF does not support the reporting of the access network information. In addition, the PCRF may also not judge whether the current access system supports the reporting of the access network information or not (for example, the PCRF does not know the type of the IP-CAN).

Step 2212: the PCRF returns an Authentication, Authorization and Accounting (AAA) message to the AF. When the PCRF determines that the PCRF does not support the reporting of the access network information in Step 2210, the PCRF carries in the AAA message an indicator used for indicating a failure of reporting the access network information, wherein the indicator may be at least one of the following information: an error code (such as used for indicating a failure of reporting the access network information or used for indicating incapability of authorizing a requested service), a parameter indicating that the access network does not support the reporting of the access network information and an identifier of a PLMN currently accessed by the UE (the identifier of the PLMN is used for identifying an access network, incapable of providing support for reporting the access network information, currently accessed by the UE); and when the access network does not support the reporting of the access network information, the AAA message may further carry the type of the IP-CAN, or the type of the IP-CAN and the type of the RAT. When the AF does not provide the service information in Step 2206 and the PCRF determines that the PCRF does not support the reporting of the access network information in Step 2210, the flow is ended.

Step 2214: when the PCRF does not determine that the current access system does not support the reporting of the access network information in Step 2210 and the AF provides the service information in Step 2206, the PCRF makes a PCC rule according to the service information, subscription information and the like, and the PCRF provides the PCC rule carrying a request used for requesting to report the access network information for the PCEF. When the PCRF does not determine that the current access system does not support the reporting of the access network information in Step 2210 and the AF does not provide the service information in Step 2206, the PCRF locally generates a PCC rule (wherein a QoS Class Identifier (QCI) and an Address Resolution Protocol (ARP) are consistent with a QCI and ARP which are born as a default), and provides the PCC rule carrying a request used for requesting to report the access network information for the PCEF.

Step 2216: the PCRF sends a diameter RAR message carrying the PCC rule to the PCEF.

Step 2218: When the PCEF receives the PCC rule and the PCC rule carries the request used for requesting to report the access network information, the PCEF judges whether the current access network supports the reporting of the access network information or not. For example, the PCEF judges whether the network currently accessed by the UE supports the reporting of the access network information or not according to the type of the IP-CAN or the type of the IP-CAN and the type of the RAT. When a judgment result is that the network currently accessed by the UE does not support the reporting of the access network information, an indicator indicating a failure of reporting the access network information is carried in a diameter RAA message returned to the PCRF by the PCEF, the indicator is an error code indicating a failure of reporting the access network information and/or an identifier of the PLMN currently accessed by the UE (the identifier of the PLMN is used for identifying an access network, currently accessed by the UE, incapable of providing support for reporting the access network information), the message may further carry the type of the IP-CAN or the type of the IP-CAN and the type of the RAT, and when the PCEF determines that the PCEF does not have support for reporting the access network information or whether the PCEF has support for reporting the access network information or not is not able to be judged, the PCEF returns a acknowledgement message to the PCRF.

Step 2220: when an indicator indicating a failure of reporting the access network information is returned in Step 2218, the PCRF sends a diameter RAR message to the AF, wherein the message carries the indicator indicating the failure of reporting the access network information. When the returned message includes the error code or a parameter indicating that the access network does not support the reporting of the access network information, specific action (Specific-Action) is carried to identify a failure of reporting the access network information, and when the returned message carries the identifier of the PLMN, the identifier of the PLMN is contained, and the message may further carry the type of the IP-CAN type or the type of the IP-CAN type and the type of the RAT.

Step 2222: the AF returns the diameter RAA message to the PCRF.

Step 2224: the PCEF performs the PCC rule, and initiates a bearer establishment flow or bearer modification flow. When the PCEF determines that the access network supports the reporting of the access network information or whether the access network supports the reporting of the access network information is not judged in Step 2218, the PCEF carries a request in a message, wherein the request is used for questing to report the access network information, and the access network reports the access network information to the PCEF according to the request of the PCEF; otherwise the PCEF does not carry the request used for questing to report the access network information.

Step 2226: after the PCEF receives the reported access network information, the PCEF sends a diameter CCR containing the access network information to the PCRF. Since other network elements such as a Serving Gateway (S-GW), a Mobility Management Entity (MME), a Serving GPRS Support Node (SGSN) and an Evolved Node B (eNB) does not support the reporting of the access network information, the PCEF may not receive the access network information. When the PCEF does not receive the access network information, the PCEF sent to the PCRF the CCR message carrying a indicator indicating a failure of reporting the access network information, the indicator is an event trigger value identifying the failure of reporting the access network information and/or the identifier of the PLMN (which identifies the PLMN which is currently accessed by the UE and may not provide reporting the access network information), and the message may also carries the type of the IP-CAN or the type of the IP-CAN and the type of the RAT.

Step 2228: the PCRF returns an acknowledgement message diameter CCA to the PCEF.

Step 2230: the PCRF sends the diameter RAR message to the AF, and when the PCEF reports the access network information, the message carries the access network information; and when the PCEF indicates a failure of reporting the access network information, the PCRF sends the diameter RAR message to the AF, the message carrying the failure of reporting the access network information, wherein, when the returned message includes an event trigger, the message carries a specific action value to identify the failure of reporting the access network information, and when the returned message includes the identifier of the PLMN, the message carries the identifier of the PLMN, and the message may also carry the type of the IP-CAN or the type of the IP-CAN type and the type of the RAT.

Step 2232: the AF returns an acknowledgement message diameter RAA to the PCRF.

Under a normal condition, capabilities of the PCEF and the PCRF in a network are equivalent, so that the PCRF is not required to check whether the PCEF supports the reporting of the access network information reporting or not, that is, the PCRF is only required to judge whether the access network supports the reporting of the access network information or not according to a type of the access network (i.e. the type of the IP-CAN).

In the preferred implementation mode, the PCRF judges whether the access network supports the reporting of the access network information or not at first, and then sends the request to the PCEF, and the PCEF performs judgment. In other embodiments, the PCEF may also send the request to the PCEF without judgment, and then the PCEF performs the judgment.

Second Preferred Implementation Mode

Figure 23:
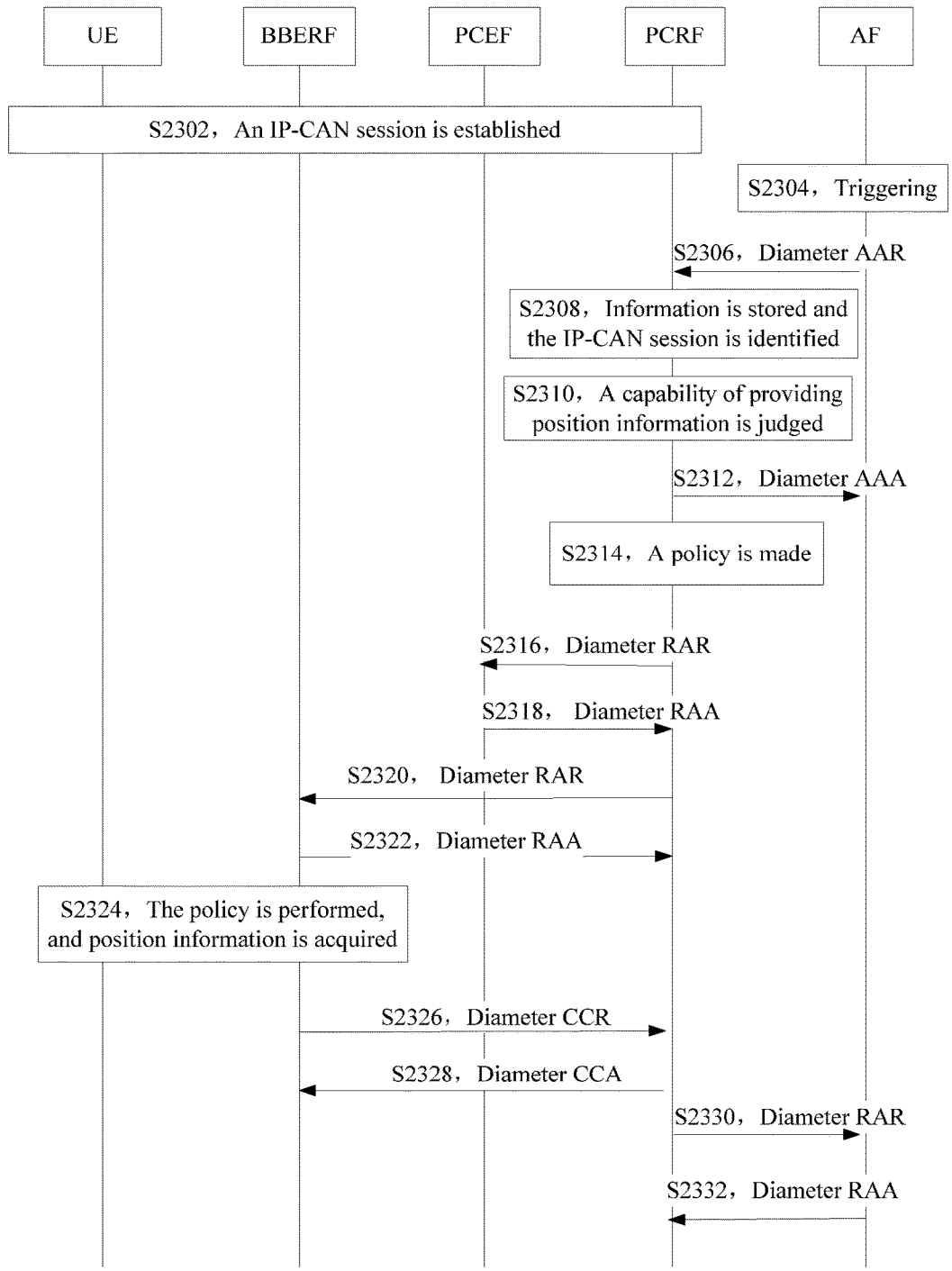
FIG. 23 is a flowchart of a second preferred implementation mode according to the present disclosure.

In the second preferred implementation mode, a flow of providing access network information by a PCC in the presence of a BBERF in a single-access or MAPCON scenario is described, FIG. 23 is a flowchart of a second preferred implementation mode according to the present disclosure, and as shown in FIG. 23, the flow includes the following steps.

Step 2302: UE is attached to a network and initiates an attachment flow, or the UE initiates another PDN connection establishment flow. An IP-CAN session is established, a PCEF establishes a Gx session with a PCRF, and a BBERF establishes a gateway control session with the PCRF. Then the PCRF may have obtained a type of the IP-CAN, a type of the RAT and whether the BBERF supports reporting of the access network information or not (a set NetLoc value of a supported-feature AVP). The PCRF may also acquire an identifier of a PLMN accessed by the UE.

Step 2304: an AF receives a triggering message and needs to initially provide service information for the PCRF and request for reporting the access network information (i.e. current position information of the UE) (that is, a session of the AF is established) or the AF receives the triggering message and needs to update the service information (that is, the session of the AF is modified) and request for reporting the access network information.

Step 2306: the AF provides the service information for the PCRF or updates the service information, and simultaneously requests for reporting the access network information. Specifically, the AF sends an AAR message to the PCRF, wherein a request used for requesting to report the access network information is carried in a Required-Access-Info AVP. The AF may also not provide any service information, and only requests for reporting the access network information.

Step 2308: the PCRF stores related information. When the AF initially provides the service information for the PCRF (that is, the session of the AF is established), the PCRF performs session binding according to information (an IP address, user identifier, PDN identifier and the like of the UE) in the AAR message, and namely the session of the AF is associated with the IP-CAN session established in Step 2302.

Step 2310: the PCRF judges whether a current access system of the UE supports reporting of the access network information or not according to a session binding result. Whether the current access system supports reporting of the access network information or not includes two parts: whether an access network supports the reporting the access network information or not (the PCRF judges whether the access network supports the reporting of the access network information or not according to the obtained type of the IP-CAN or the type of the IP-CAN and the type of the RAT) and whether the BBERF supports the reporting of the access network information or not. For example, the PCRF may obtain that the type of the current IP-CAN is a 3GPP-GPRS or a 3GPP-EPS and the BBERF indicates that the BBERF supports the reporting of the access network information, and then the PCRF determines that the reporting of the access network information may be provided. When the type of the IP-CAN type obtained by the PCRF is a non-3GPP EPS or the BBERF indicates that the BBERF does not support the reporting of the access network information, the PCRF determines that the reporting of the access network information may not be provided (for example, the PCRF does not know the type of the IP-CAN).

Step 2312: the PCRF returns an AAA message to the AF. When the PCRF determines that the reporting of the access network information may not be provided in Step 2310, the PCRF carries an indicator in the AAA message, wherein the indicator indicates a failure of reporting the access network information, wherein the indicator may be at least one of the following information: an error code (such as, used for indicating a failure of reporting the access network information or indicating that a requested service is not able to be authorized), a parameter indicating that the access network does not support the reporting of the access network information and an identifier of a PLMN currently accessed by the UE (the identifier of the PLMN is used for identifying a current access network, incapable of providing access network information reporting, of the UE); and when the access network does not support the reporting the access network information, the message may also carry the type of the IP-CAN or the type of the IP-CAN and the type of the RAT. When the AF does not provide the service information in Step 2306 and the PCRF determines that the reporting of the access network information may not be provided in Step 2310, the flow is ended.

Step 2314: when the PCRF determines that the current access system supports the reporting of the access network information or whether the current access system supports the reporting of the access network information is not able to be judged in Step 2310 and the AF provides the service information in Step 2306, the PCRF makes a PCC rule and a corresponding QoS rule according to the service information, subscription information and the like, and the PCRF provides for the BBERF the QoS rule carrying the request used for reporting to report the access network information. When the PCRF determines that the current access system supports the reporting of the access network information in Step 2310 and the AF does not provide the service information in Step 2306, the PCRF locally generates a QoS rule (wherein a QCI and an ARP are consistent with a QCI and ARP which are born as a default), and provides for the BBERF the QoS rule carrying the request used for questing to report the access network information.

Step 2316: the PCRF sends a diameter RAR message carrying the PCC rule to the PCEF.

Step 2318: the PCEF returns a diameter RAA message to the PCRF.

When the AF does not provide the service information in Step 2306, Step 2316 and Step 2318 may be omitted.

Step 2320: the PCRF sends a diameter RAR message to the BBERF.

Step 2322: the BBERF returns a diameter RAA message to the PCRF.

Step 2324: the BBERF performs the QoS rule, and initiates a bearer establishment flow or bearer modification flow, the BBERF carries in the message a request used for questing to report the access network information, and the access network reports the access network information to the BBERF according to the request of the BBERF.

Step 2326: after the BBERF receives the reported access network information, the BBERF sends to the PCRF a Diameter CCR carrying the access network information. Since other network elements such as an S-GW, an MME, an SGSN and an eNB does not support the reporting of the access network information, the BBERF may not receive the access network information. When the BBERF does not receive the access network information, the BBERF sends to the PCRF the CCR message carrying a indicator indicating a failure of reporting the access network information, the indicator may be an event trigger value identifying the failure of reporting the access network information and/or the identifier of the PLMN (which identifies the PLMN which is currently accessed by the UE and may not provide access network information reporting), and the message may also carry the type of the IP-CAN or the type of the IP-CAN and the type of the RAT.

Step 2328: the PCRF returns an acknowledgement message diameter CCA to the PCEF.

Step 2330: the PCRF sends the diameter RAR message to the AF, and when the BBERF reports the access network information, the diameter RAR message carries the access network information; and when the BBERF indicates a failure of reporting the access network information, the PCRF sends the diameter RAR message to the AF, the diameter RAR message carrying an indicator indicating a failure of reporting the access network information, wherein, when the returned message includes an event trigger, the message carries a specific action value to identify the failure of reporting the access network information, and when the returned message includes the identifier of the PLMN, the diameter RAR message carries the identifier of the PLMN, and the diameter RAR message may also carry the type of the IP-CAN or the type of the IP-CAN and the type of the RAT.

Step 2332: the AF returns an acknowledgement message diameter RAA to the PCRF.

Under a normal condition, capabilities of the BBERF and the PCRF in a network are equivalent, so that the PCRF is not required to check whether the BBERF supports the reporting of the access network information or not, that is, the PCRF is only required to judge whether the access network supports the reporting of the access network information or not according to a type of the access network (i.e. the type of the IP-CAN).

Third Preferred Implementation Mode

Figure 24:
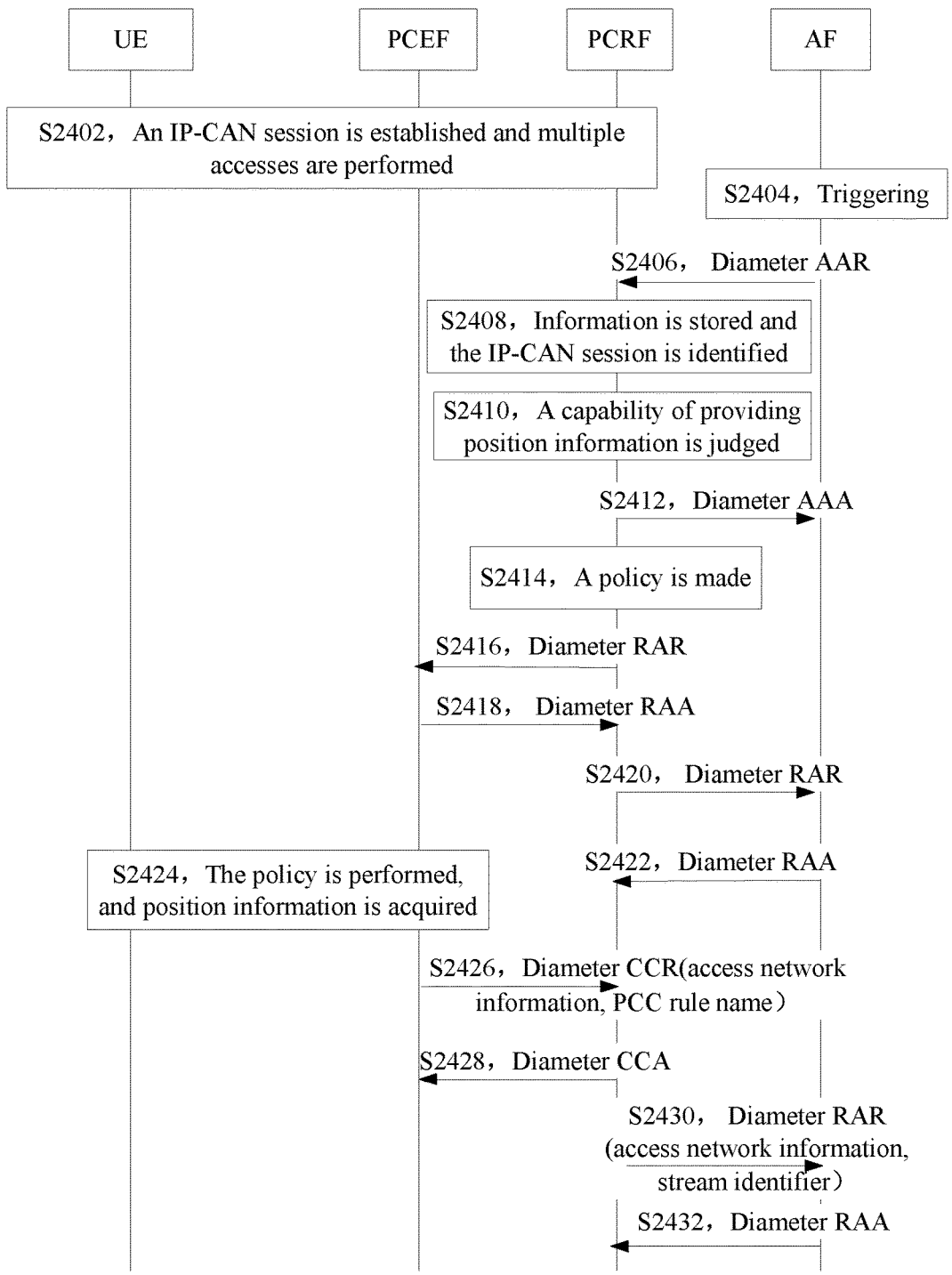
FIG. 24 is a flowchart of a third preferred implementation mode according to the present disclosure.

In the third preferred implementation mode, a flow of providing access network information by a PCC in the absence of a BBERF in an IFOM scenario is described, FIG. 24 is a flowchart of a third preferred implementation mode according to the present disclosure, and as shown in FIG. 24, the flow includes the following steps.

Step 2402: UE establishes an IP-CAN session through multiple access (3GPP access and trusted non-3GPP access network (such as TWAN) access). A PCEF establishes a Gx session with a PCRF. Then the PCRF may have obtained types of the IP-CANs (one is a 3GPP-EPS and the other is a non-3GPP EPS) connected by two access network, corresponding types of the RATs and whether the PCEF supports reporting of the access network information or not (a set NetLoc value of a supported-feature AVP). The PCRF may also acquire an identifier of a PLMN accessed by the UE.

Step 2404: an AF receives a triggering message and needs to initially provide service information for the PCRF and request for reporting the access network information (i.e. current position information of the UE) (that is, a session of the AF is established) or the AF receives the triggering message and needs to update the service information (that is, the session of the AF is modified) and request for reporting the access network information report.

Step 2406: the AF provides the service information for the PCRF or updates the service information, and simultaneously requests for the reporting of the access network information. Specifically, the AF sends an AAR message to the PCRF, wherein a request used for questing to report the access network information is carried in a Required-Access-Info AVP. The initially provided or updated service information includes two or more than two service data streams (such as a voice and a video).

Step 2408: the PCRF stores related information. When the AF initially provides the service information for the PCRF (that is, the session of the AF is established), the PCRF performs session binding according to information (an IP address, user identifier, PDN identifier and the like of the UE) in the AAR message, and namely the session of the AF is associated with the IP-CAN session established in Step 2402.

Step 2410: the PCRF determines the access network connections where multiple service data streams should be transmitted respectively according to own policy, an IPOM rule reported by the PCEF or the like, and judges whether access systems support the reporting of the access network information or not according to types of access networks through which each service data stream is transmitted. Whether the current access system supports the reporting of the access network information or not includes two parts: whether the access network supports the reporting of the access network information or not (the PCRF judges whether the access network supports the reporting of the access network information or not according to the obtained type of the IP-CAN or the type of the IP-CAN and the type of the RAT or the type of the RAT and trusted/untrusted indication information of a WLAN, and for a TWAN, whether the access network supports the reporting of the access network information or not may also be judged according to an identifier of the TWAN) and whether the PCEF supports the reporting of the access network information or not. For example, the PCRF may obtain that the type of the current IP-CAN is a 3GPP-GPRS or a 3GPP-EPS and the PCEF indicates that the PCEF supports the reporting of the access network information, and then the PCRF determines that the access network where the service data flow is transmitted may provide the reporting of the access network information. When the type of the IP-CAN obtained by the PCRF is a non-3GPP EPS or the PCEF indicates that the PCEF does not support the reporting of the access network information, the PCRF determines that the reporting of the access network information is not able to be provided. In addition, the PCRF may also not judge whether the current access system supports the reporting of the access network information or not (for example, the PCRF does not know the type of the IP-CAN).

Step 2412: the PCRF returns an AAA message to the AF. When the PCRF determines that the access network connection where at least one service data stream is transmitted may not provide the reporting of the access network information in Step 2410, the PCRF carries an indicator in the AAA message, wherein the indicator indicates a failure of reporting the access network information, wherein the indicator may be at least one of the following information: an error code (such as used for indicating a failure of reporting the access network information or indicating that a requested service is not able to be authorized), an indicator indicating that the access network does not support the reporting of the access network information and an identifier of a PLMN of the access network where the service data stream is transmitted. When the failure of reporting the access network information is indicating, an identifier of the corresponding service stream is carried. When the access network does not support the reporting of the access network information, the message may also carry the types of the IP-CANs or the types of the IP-CANs and the types of the RATs.

Step 2414: the PCRF makes PCC rules according to the service information, subscription information and the like. For each service data stream, when the PCRF does not determine that the current access system does not support the reporting of the access network information in Step 2410 (that is the PCRF determines that the corresponding access system supports the reporting of the access network information or whether the access system supports the reporting of the access network information or not is not able to be judged), the PCRF provides for the PCEF the corresponding PCC rule carrying the request used for requesting to report the access network information.

Step 2416: the PCRF sends to the PCEF a diameter RAR message carrying the PCC rule.

Step 2418: when the PCEF receives the PCC rule and the PCC rule carries a request used for questing to report the access network information, the PCEF judges whether the corresponding access network supports the reporting of the access network information or not. For example, the PCEF judges whether the network where the current service data stream is transmitted supports the reporting of the access network information or not according to the type of the IP-CAN type or the type of the IP-CAN and the type of the RAT. When a judgment result is that the network where the current service data stream is transmitted does not support the reporting of the access network information, an indicator indicating a failure of reporting the access network information is carried in a diameter RAA message returned to the PCRF by the PCEF, wherein the indicator may be at least one of the following information: an error code (such as used for indicating the failure of reporting of the access network information), an indicator indicating that the access network does not support the reporting of the access network information, and the identifier of the PLMN of the access network where the service data scream is transmitted. When the failure of the reporting of the access network information is indicating, the corresponding PCC rule name is carried, the type of the IP-CAN or the type of the IP-CAN and the type of the RAT are also carried, and when the judgment result is that the network where the current service data stream is transmitted supports the reporting of the access network information, or whether the network where the current service data stream is transmitted supports the reporting of the access network information or not is not able to be judged, the PCEF returns an acknowledgement message to the PCRF.

Step 2420: when the indicator indicating the failure of reporting the access network information is returned in Step 2418, the PCRF sends the diameter RAR message to the AF, the diameter RAR message carrying specific action identifying that the reporting of the access network information may not be provided or carrying the identifier of the PLMN. When the PCRF indicates the abovementioned information, the identifier of the corresponding service stream is carried, and the type of the IP-CAN or the type of the IP-CAN and the type of the RAT may also be carried.

Step 2422: the AF returns the diameter RAA message to the PCRF.

Step 2424: the PCEF performs the PCC rule, and initiates a bearer establishment flow or a bearer modification flow. When the PCEF determines that the access network supports the reporting of the access network information or whether the access network supports the reporting of the access network information is not able to be judged in Step 2418, the PCEF carries a request in a message, wherein the request is used for requesting to report the access network information, and the access network reports access network information to the PCEF according to the request of the PCEF; otherwise the PCEF does not carry the request used for requesting to report the access network information.

Step 2426: after the PCEF receives the reported access network information, the PCEF sends a diameter CCR carrying the access network information and the corresponding PCC rule name to the PCRF. (For different service streams, the PCEF may receive different access network information, so that the PCEF needs to report each PCC rule and the corresponding access network information to the PCRF). Since other network elements such as an S-GW, an MME, an SGSN and an eNB does not support the reporting of the access network information, the PCEF may not receive the access network information. When the PCEF does not receive the access network information, the PCEF sends to the PCRF a CCR message carrying an indicator indicating a failure of reporting the access network information, the indicator may be an event trigger value identifying the failure of reporting the access network information and/or the identifier of the PLMN (which identifies the PLMN which is currently accessed by the UE and may not provide access network information reporting), and the CCR message may also carry the type of the IP-CAN or the type of the IP-CAN and the type of the RAT.

Step 2428: the PCRF returns an acknowledgement message diameter CCA to the PCEF.

Step 2430: the PCRF sends the diameter RAR message to the AF, and when the PCEF reports the access network information, the message carries the access network information and the identifiers of the corresponding streams; and when the PCEF indicates a failure of reporting the access network information, the PCRF sends the diameter RAR message to the AF, the message carrying the failure of reporting the access network information. When the message returned by the PCEF includes an event trigger, the message carries a specific action value to identify the failure of reporting the access network information, and when the returned message includes the identifier of the PLMN, the message carries the identifier of the PLMN, and when the abovementioned information is indicated, the PCRF also carries the identifiers of the corresponding streams, and the message may also carry the type of the IP-CAN or the type of the IP-CAN and the type of the RAT.

Step 2432: the AF returns an acknowledgement message diameter RAA to the PCRF.

Under a normal condition, capabilities of the PCEF and the PCRF in a network are equivalent, so that the PCRF is not required to check whether the PCEF supports the reporting of the access network information or not, that is, the PCRF is only required to judge whether the access network supports the reporting of the access network information reporting according to a type of the access network (i.e. the type of the IP-CAN).

In the preferred implementation mode, the PCRF is provided with a corresponding relationship between a PCC rule name and an identifier of scream, so that the PCRF maps the PCC rule name reported by the PCEF to the identifier of the stream required to be reported to the AF. In the related art, IPOM only supports simultaneous access of the UE to an Evolved Packet Core (EPC) through 3GPP access and WLAN access, so that the PCRF may also determine, without reporting the name of the PCC rule by the PCEF, the service data stream related to the information reported by the PCEF to further map the service data stream to the identifier of the stream required to be reported to the AF under the condition that the PCRF obtains the access network connections where the service data streams are transmitted and the WLAN does not support the reporting of the access network information in such a scenario. Therefore, based on the above analysis, the PCEF is not required to report the name of the PCC rule.

Fourth Preferred Implementation Mode

Figure 25:
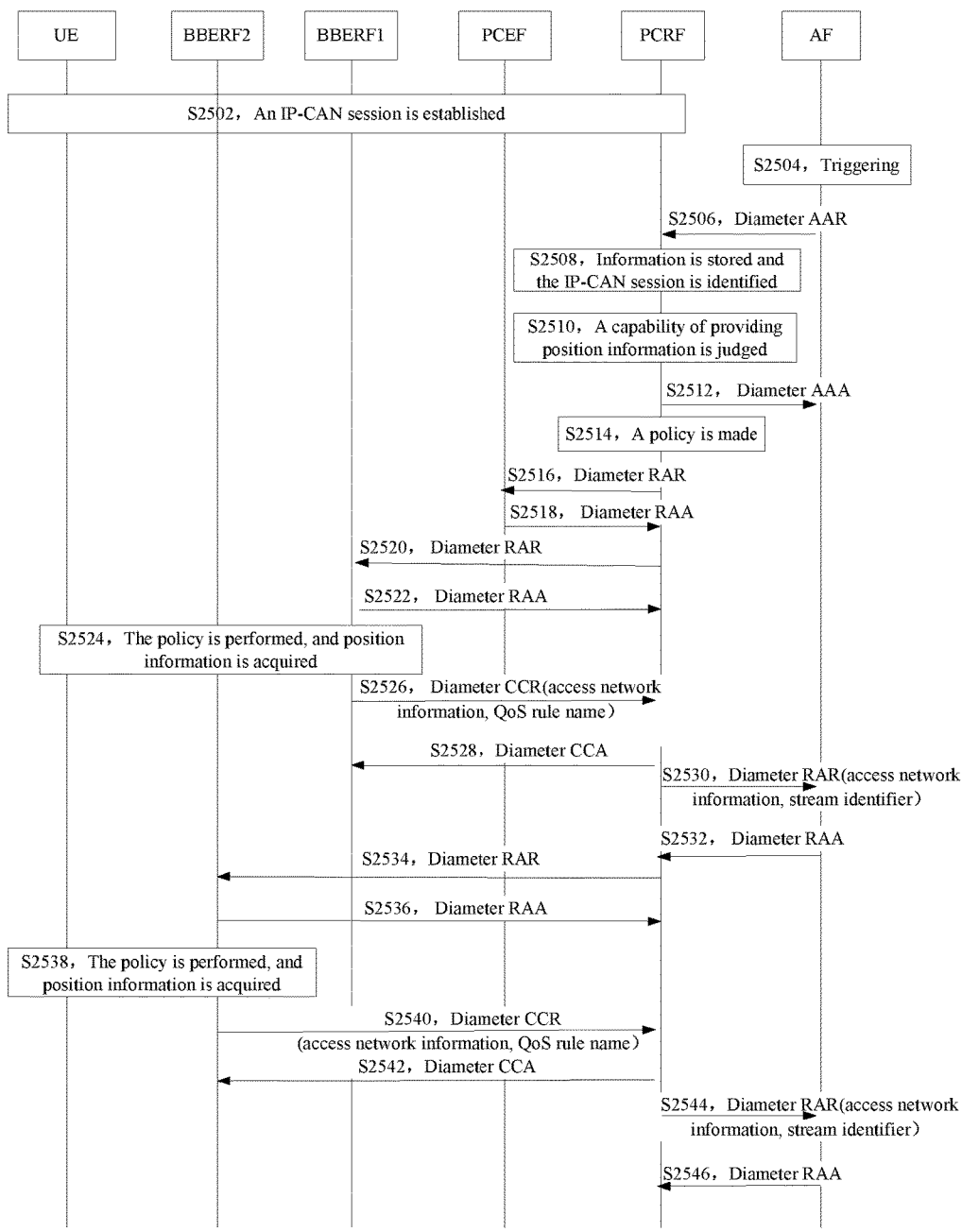
FIG. 25 is a flowchart of a fourth preferred implementation mode according to the present disclosure.

In the fourth preferred implementation mode, a flow of providing access network information by a PCC in the presence of BBERFs in an IFOM scenario is described (wherein BBERF1 and BBERF2 are located in different access networks respectively), FIG. 25 is a flowchart of a fourth preferred implementation mode according to the present disclosure, and as shown in FIG. 25, the flow includes the following steps.

Step 2502: UE establishes an IP-CAN session through multiple accesses (3GPP access and trusted non-3GPP access network (such as TWAN) access). A PCEF establishes a Gx session with a PCRF (BBERF)1 establishes gateway control session 1 with the PCRF and BBERF2 establishes gateway control session 2 with the PCRF. Then the PCRF may have obtained types of IP-CANs (one is a 3GPP-EPS and the other is a non-3GPP EPS) of two access network connections, corresponding RAT types and whether the PCEF supports reporting of the access network information or not (a set NetLoc value of a supported-feature AVP). The PCRF may also acquire an identifier of a PLMN accessed by the UE.

Step 2504: an AF receives a triggering message and needs to initially provide service information for the PCRF and request for reporting the access network information (i.e. current position information of the UE) (that is, a session of the AF is established) or the AF receives the triggering message and needs to update the service information (that is, the session of the AF is modified) and request for reporting the access network information reporting.

Step 2506: the AF provides the service information for the PCRF or updates the service information, and simultaneously requests for reporting the access network information reporting. Specifically, the AF sends an AAR message to the PCRF, and a request is carried in a Required-Access-Info AVP, wherein the request is used for questing to report the access network information.

Step 2508: the PCRF stores related information. When the AF initially provides the service information for the PCRF (that is, the session of the AF is established), the PCRF performs session binding according to information (an IP address, user identifier, PDN identifier and the like of the UE) in the AAR message, and namely the session of the AF is associated with the IP-CAN session established in Step 2502.

Step 2510: the PCRF determines the access network connections where multiple service data streams should be transmitted respectively according to own policy, an IPOM rule reported by the PCEF or the like, and judges whether access systems support the reporting of the access network information or not according to types of access networks through which each service data flow is transmitted. Whether the current access system supports the reporting of the access network information or not includes two parts: whether the access network supports the reporting of the access network information or not (the PCRF judges whether the access network supports the reporting of the access network information or not according to the obtained type of the IP-CAN or the type of the IP-CAN and the type of the RAT or the type of the RAT and trusted/untrusted indication information of a WLAN, and for a TWAN, whether the access network supports the reporting of the access network information or not may also be judged according to an identifier of the TWAN) and whether the BBERFs support the reporting of the access network information reporting or not. For example, the PCRF may obtain that the type of the current IP-CAN is a 3GPP-GPRS or a 3GPP-EPS and the BBERFs indicate that the BBERFs supports the reporting of the access network information, and then the PCRF determines that the access network where the service data stream is transmitted may provide the reporting of the access network information. When the type of the IP-CAN obtained by the PCRF is a non-3GPP EPS or the BBERFs indicate that the BBERFs do not support the reporting of the access network information, the PCRF determines that the reporting of the access network information is not able to be provided. In addition, the PCRF may also not judge whether the current access system supports the reporting of the access network information or not (for example, the PCRF does not know the type of the IP-CAN).

Step 2512: the PCRF returns an AAA message to the AF. When the PCRF determines that at least one access network connection where a service stream flow is transmitted may not provide the reporting of the access network information in Step 2510, the PCRF carries in the AAA message a indicator indicating a failure of reporting the access network information, wherein the indicator may be at least one of the following information: an error code (such as used for indicating the failure of reporting the access network information or indicating that a requested service is not able to be authorized), a parameter indicating that the access network does not support the reporting of the access network information and an identifier of a PLMN (which identifies the which is currently accessed by the UE and may not provide access network information reporting). When the above-mentioned information is indicated, an identifier of the corresponding service stream is carried. When the access network does not support the reporting of the access network information, the message may also carry the types of the IP-CANs or the types of the IP-CANs and the types of the RATs.

Step 2514: the PCRF makes PCC rules and corresponding QoS rules according to the service information, subscription information and the like. Moreover, When the PCRF determines that the current access system supports the reporting of the access network information or whether the current access system supports the reporting of the access network information or not is not able to be judged in Step 2510, the PCRF carries a request in the QoS rule, wherein the request is used for requesting to report the access network information.

Step 2516: the PCRF sends a diameter RAR message carrying the PCC rule to the PCEF.

Step 2518: the PCEF returns a diameter RAA message to the PCRF.

Step 2520: when there is a service data stream required to be transmitted in the access network connection where BBERF1 is located, the PCRF sends a diameter RAR message carrying the QoS rule to BBERF1. When the access network where BBERF1 is located supports the reporting of the access network information, the QoS rule carries a request used for requesting to report the access network information.

Step 2522: BBERF1 returns the diameter RAA message to the PCRF.

Step 2524: BBERF1 performs the PCC rule, and initiates a bearer establishment flow or a bearer modification flow. BBERF1 carries in a message a request used for requesting to report the access network information, and the access network reports access network information to BBERF1 according to the request of BBERF1.

Step 2526: after BBERF1 receives the reported access network information (BBERF)1 sends a diameter CCR carrying the access network information and the name of the corresponding PCC rule to the PCRF. Since other network elements such as an S-GW, an MME, an SGSN and an eNB does not support reporting of the access network information (BBERF)1 may not receive the access network information. When BBERF1 does not receive the access network information (BBERF)1 sends to the PCRF in the CCR message carrying an event trigger value identifying a failure of reporting the access network information and/or the identifier of the PLMN (which identifies the PLMN which is currently accessed by the UE and may not provide access network information reporting), and the message may also carry the type of the IP-CAN or the type of the IP-CAN and the type of the RAT.

Step 2528: the PCRF returns an acknowledgement message diameter CCA to BBERF1.

Step 2530: the PCRF sends the diameter RAR message to the AF, and when BBERF1 reports the access network information, the diameter RAR message carries the access network information and the identifiers of the corresponding streams; and when BBERF1 indicates the failure of reporting the access network information, the PCRF sends the diameter RAR message to the AF, wherein the diameter RAR message carries an indicator indicating the failure of reporting the access network information. When the message returned by BBERF1 includes an event trigger, the message carries a specific action value to identify the failure of reporting the access network information, and when the returned message includes the identifier of the PLMN, the message carries the identifier of the PLMN, and when the abovementioned information is indicated, the PCRF also carries the identifier of the corresponding stream, and the message may also carry the type of the IP-CAN or the type of the IP-CAN and the type of the RAT.

Step 2532: the AF returns an acknowledgement message diameter RAA to the PCRF.

Step 2534: when there is a service data stream required to be transmitted in the access network connection where BBERF2 is located, the PCRF sends a diameter RAR message carrying the QoS rule to BBERF2. When the access network where BBERF2 is located supports the reporting of the access network information, the QoS rule carries a request used for requesting to report the access network information.

Step 2536: BBERF2 returns the diameter RAA message to the PCRF.

Step 2538: BBERF2 performs the PCC rule, and initiates a bearer establishment flow or a bearer modification flow. BBERF2 carries in a message a request used for questing to report the access network information, and the access network reports the access network information to BBERF2 according to the request of BBERF2.

Step 2540: after BBERF2 receives the reported access network information (BBERF)2 sends a diameter CCR carrying the access network information and the name of the corresponding PCC rule to the PCRF. Since the other network elements such as the MME, the SGSN and the eNB do not support the reporting of the access network information (BBERF)2 may not receive the access network information. When BBERF2 does not receive the access network information (BBERF)2 sends to the PCRF the CCR message carrying an indicator indicating a failure of reporting the access network information, wherein the indicator may be an event trigger value identifying the failure of reporting the access network information and/or the identifier of the PLMN (which identifies the PLMN which is currently accessed by the UE and is not able to provide access network information reporting), and the message may also carry the type of the IP-CAN or the type of the IP-CAN and the type of the RAT.

Step 2542: the PCRF returns an acknowledgement message diameter CCA to BBERF2.

Step 2544: the PCRF sends the diameter RAR message to the AF, and when BBERF2 reports the access network information, wherein the diameter RAR message carries the access network information and the identifiers of the corresponding streams; and when BBERF2 indicates the failure of reporting the access network information, the PCRF sends the diameter RAR message to the AF, wherein the RAR message carries an indicator indicating a failure of reporting the access network information. When the message returned by BBERF2 includes an event trigger, the RAR message carries a specific action value (which identifies the failure of reporting the access network information), and when the returned message includes the identifier of the PLMN, the RAR message carries the identifier of the PLMN. When the abovementioned information is indicated, the PCRF also carries the identifier of the corresponding stream, and the message may also carry the type of the IP-CAN or the type of the IP-CAN and the type of the RAT.

Step 2546: the AF returns an acknowledgement message diameter RAA to the PCRF.

Under a normal condition, capabilities of the BBERF and the PCRF in a network are equivalent, so that the PCRF is not required to check whether the BBERF supports the reporting of the access network information or not, that is, the PCRF is only required to judge whether the access network supports the reporting of the access network information or not according to a type of the access network (i.e. the type of the IP-CAN).

In the preferred implementation mode, the PCRF is provided with a corresponding relationship between a name of a QoS rule and an identifier of a stream, so that the PCRF maps the name of the QoS rule reported by the BBERF to the identifier of the stream required to be reported to the AF. In the related art, IPOM only supports simultaneous access of the UE to an EPC through 3GPP access and WLAN access, so that the PCRF may also determine, without reporting the name of the Qos by the BBERF, the service data stream related to the information reported by the BBERF to further map the service data stream to the identifier of the stream required to be reported to the AF under the condition that the PCRF obtains the access network connections where the service data streams are transmitted and the WLAN does not support the reporting the access network information in such a scenario. Therefore, based on the above analysis, the BBERF is not required to report the name of the PCC rule.

Fifth Preferred Implementation Mode

Figure 26:
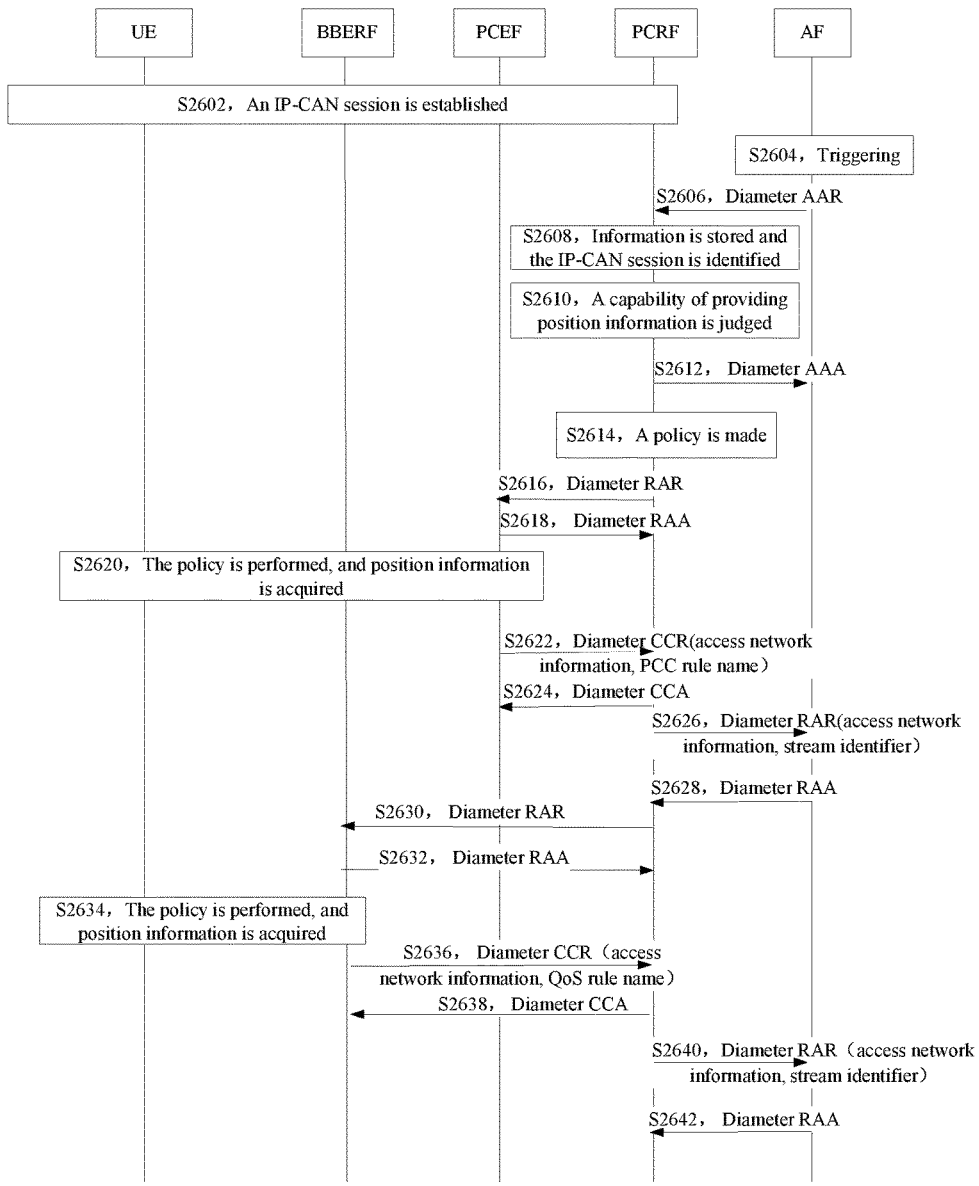
FIG. 26 is a flowchart of a fifth preferred implementation mode according to the present disclosure.

In the fifth preferred implementation mode, a flow of providing position information of UE by a PCC in the presence of a BBERF in an IFOM scenario is described (wherein the BBERFs exist in one access and do not exist in another access), FIG. 26 is a flowchart of a fifth preferred implementation mode according to the present disclosure, and as shown in FIG. 26, the flow includes the following steps.

Step 2602: UE establishes an IP-CAN session through multiple accesses 3GPP access and trusted non-3GPP access network (such as TWAN) access. A PCEF establishes a Gx session with a PCRF (BBERF)1 establishes gateway control session 1 with the PCRF and BBERF2 establishes gateway control session 2 with the PCRF. Then the PCRF may obtain types of IP-CANs (one is a 3GPP-EPS and the other is a non-3GPP EPS) of two access network connections, types of corresponding RATs and whether the PCEF supports the reporting of the access network information or not (a set NetLoc value of a supported-feature AVP). The PCRF may also acquire an identifier of a PLMN accessed by the UE.

Step 2604: an AF receives a triggering message and needs to initially provide service information for the PCRF and request for reporting the access network information (i.e. current position information of the UE) (that is, a session of the AF is established) or the AF receives the triggering message and needs to update the service information and request for reporting the access network information (that is, the session of the AF is modified).

Step 2606: the AF provides the service information for the PCRF or updates the service information, and simultaneously requests for reporting the access network information. Specifically, the AF sends an AAR message to the PCRF, wherein a request used for requesting to report the access network information is carried in a Required-Access-Info AVP.

Step 2608: the PCRF stores related information. When the AF initially provides the service information for the PCRF (that is, the session of the AF is established), the PCRF performs session binding according to information (an IP address, user identifier, PDN identifier and the like of the UE) in the AAR message, and namely the session of the AF is associated with the IP-CAN session established in Step 2602.

Step 2610: the PCRF determines the access network connections where multiple service data streams should be transmitted respectively according to own policy, an IPOM rule reported by the PCEF or the like, and judges whether the access systems support the reporting of the access network information or not according to type of each access network through which each service data stream is transmitted. Whether the current access system supports the reporting of the access network information or not includes two parts: whether the access network supports the reporting of the access network information or not (the PCRF judges whether the access network supports the reporting of the access network information or not according to the obtained type of the IP-CAN or the obtained type of the IP-CAN and the obtained type of the RAT or the obtained type of the RAT and trusted/untrusted indication information of a WLAN, and for a TWAN, whether the access network supports the reporting of the access network information or not may also be judged according to an identifier of the TWAN) and whether the BBERFs support the reporting of the access network information or not. For example, the PCRF may obtain that the type of the current IP-CAN is a 3GPP-GPRS or a 3GPP-EPS and the BBERFs indicate that the BBERFs support the reporting of the access network information, and then the PCRF determines that the access network where the service data stream is transmitted may provide the reporting of the access network information. When the obtain type of the IP-CAN by the PCRF is a non-3GPP EPS or the BBERFs indicate that the BBERFs do not support the reporting of the access network information, the PCRF determines that the reporting of the access network information may not be provided. In addition, whether the current access system supports the reporting of the access network information reporting or not is also not able to be judged by the PCRF (for example, the PCRF does not know the type of the IP-CAN).

Step 2612: the PCRF returns an AAA message to the AF. When the PCRF determines that at least one access network connection where a service data stream is transmitted may not provide the reporting of the access network information in Step 2610, the PCRF carries in the AAA message an indicator indicating a failure of reporting the access network information, wherein the indicator may be at least one of the following information: an error code (such as used for indicating the failure of reporting the access network information or indicating that a requested service is not able to be authorized), a parameter indicating that the access network does not support the reporting of the access network information and an identifier of a PLMN of the access network where the service data stream is transmitted. When the abovementioned information is indicated, the PCRF provides an identifier of the corresponding service stream, and when the access network does not support the reporting of the access network information, the message may also carry the types of the IP-CANs or the types of the IP-CANs and the types of the RATs.

Step 2614: the PCRF makes PCC rules and corresponding QoS rules according to the service information, subscription information and the like.

Step 2616: the PCRF sends a diameter RAR message carrying the PCC rule to the PCEF, and when the PCRS has a service data stream transmitted in the access network without BBERFs and the PCRF determines that the corresponding access network supports the reporting of the access network information or whether the corresponding access network supports the reporting of the access network information is not able to be judged, the PCRF carries in the PCC rule carrying a request used for questing to report the access network information.

Step 2618: the PCEF returns a diameter RAA message to the PCRF.

Step 2620: the PCEF performs the PCC rule, and initiates a bearer establishment flow or a bearer modification flow. When the PCC rule carries an indicator indicating that the reporting of the access network information is supported, the PCEF carries in a message a request used for requesting to report the access network information, and the access network reports access network information to the PCEF according to the request of the PCEF; otherwise the PCEF does not carry the request used for requesting to report the access network information.

Step 2622: after the PCEF receives the reported access network information, the PCEF sends a diameter CCR carrying the access network information and the name of the corresponding PCC rule to the PCRF. Since other network elements such as an S-GW, an MME, an SGSN and an eNB does not support the reporting of the access network information, the PCEF may not receive the access network information. When the PCEF does not receive the access network information, the PCEF sends to the PCRF the CCR message carrying an indicator indicating a failure of reporting the access network information, wherein the indicator may be an event trigger value (identifying the failure of reporting the access network information) and/or the identifier of the PLMN (which identifies the PLMN which is currently accessed by the UE and may not provide access network information reporting), and the message may also carry the type of the IP-CAN or the type of the IP-CAN and the type of the RAT.

Step 2624: the PCRF returns an acknowledgement message diameter CCA to the PCEF.

Step 2626: the PCRF sends the diameter RAR message to the AF, and when the PCEF reports the access network information, the diameter RAR message carries the access network information and the identifiers of the corresponding streams; and when the PCEF indicates the failure of reporting the access network information, the PCRF sends the diameter RAR message to the AF, wherein the diameter RAR message carries a indicator indicating the failure of reporting the access network information. When the message returned by the PCEF includes an event trigger, the message contains a specific action value to identify the failure of reporting the access network information, and when the returned message includes the identifier of the PLMN, the message carries the identifier of the PLMN. When the abovementioned information is indicated, the PCRF also carries the identifier of the corresponding stream, and the message may also carry the type of the IP-CAN or the type of the IP-CAN and the type of the RAT.

Step 2628: the AF returns an acknowledgement message diameter RAA to the PCRF.

Step 2630: when there is a service data stream required to be transmitted in the access network connection where each BBERF is located, the PCRF sends a diameter RAR message carrying the QoS rule to each BBERF. When the access network where each BBERF is located supports the reporting of the access network information, the QoS rule carries the request used for requesting to report the access network information.

Step 2632: each BBERF returns the diameter RAA message to the PCRF.

Step 2634: each BBERF performs the PCC rule, and initiates a bearer establishment flow or a bearer modification flow. Each BBERF carries in a message a request used for requesting to report the access network information, and the access network reports access network information to each BBERF according to the request of each BBERF.

Step 2636: after each BBERF receives the reported access network information, each BBERF sends to the PCRF a diameter CCR carrying the access network information and the name of the corresponding PCC rule. Since the other network elements such as the MME, the SGSN and the eNB do not support the reporting of the access network information, the BBERFs may not receive the access network information. When the BBERFs do not receive the access network information, each BBERF sends to the PCRF the CCR message carrying an indicator indicating a failure of reporting the access network information, wherein the indicator may be an event trigger value (identifying the failure of reporting the access network information) and/or the identifier of the PLMN (which identifies the PLMN which is currently accessed by the UE and may not provide access network information reporting), and the message may also carry the type of the IP-CAN or the type of the IP-CAN and the type of the RAT.

Step 2638: the PCRF returns an acknowledgement message diameter CCA to the BBERFs.

Step 2640: the PCRF sends the diameter RAR message to the AF, and when each BBERF reports the access network information, the diameter RAR message carries the access network information and the identifiers of the corresponding stream; and when each BBERF indicates the failure of reporting the access network information, the PCRF sends the diameter RAR message to the AF, wherein the message carries an indicator indicating a failure of reporting the access network information. When the message returned by each BBERF includes an event trigger, the message carries a specific action value (which identifies the failure of reporting the access network information), and when the returned message includes the identifier of the PLMN, the message carries the identifier of the PLMN. When the abovementioned information is indicated, the PCRF also carries the identifier of the corresponding stream, and the message may also carry the type of the IP-CAN or the type of the IP-CAN and the type of the RAT.

Step 2642: the AF returns an acknowledgement message diameter RAA to the PCRF.

Under a normal condition, capabilities of the BBERF, the PCEF and the PCRF in a network are equivalent, so that the PCRF is not required to check whether the BBERF supports the reporting of the access network information or not, that is, the PCRF is only required to judge whether the access network supports the reporting of the access network information or not according to a type of the access network (i.e. the IP-CAN type).

In the preferred implementation mode, the PCRF is provided with a corresponding relationship between a name of the PCC/QoS rule and an identifier of a stream, so that the PCRF maps the name of the PCC/QoS rule reported by the PCEF/BBERF to the identifier of the stream required to be reported to the AF. In the related art, IPOM only supports simultaneous access of the UE to an EPC through 3GPP access and WLAN access, so that the PCRF may also determine, without reporting the name of the PCC/QoS rule by the PCEF/BBERF, the service data flow related to the information reported by the PCEF/BBERF to further map the service data stream to the identifier of the stream required to be reported to the AF under the condition that the PCRF obtains the access network connections where the service data streams are transmitted and the WLAN does not support the reporting of the access network information in such a scenario. Therefore, based on the above analysis, the PCEF/BBERF is not required to report the PCC rule name.

In the abovementioned embodiments and preferred implementation modes, single access refers to a condition that the UE may access a network and perform data transmission through one access network at the same time; MAPCON refers to a condition that the UE may simultaneously access the network and establish different PDN connections through different access networks and the UE may simultaneously perform data transmission through these PDN connections (for MAPCON, although the UE may simultaneously access multiple access networks, for one AF session, the data may be transmitted in only one access network at the same time, so that MAPCON in the present disclosure may be equivalent to access of the UE to one access network); and IFOM refers to a condition that the UE simultaneously accesses multiple access networks and transmits data belonging to the same PDN connection through different access networks (that is, for an AF session, the data may be transmitted in two or more than two access networks at the same time).

Obviously, those skilled in the art should know that each component or step of the present disclosure may be implemented by a universal computing device, and the components or steps may be concentrated on a single computing device or distributed on a network formed by a plurality of computing devices, and may optionally be implemented by programmable codes executable for the computing devices, so that the components or steps may be stored in a storage device for execution with the computing devices, and the shown or described steps may be executed in a sequence different from that shown here under certain circumstances, or the components or steps may form each integrated circuit component respectively, or multiple components or steps therein can form a single integrated circuit component for implementation. As a consequence, the present disclosure is not limited to any specific hardware and software combination.

The above is only the preferred embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

As mentioned above, the method and device for processing access network information of the UE, PCRF (BBERF) and AF provided by the embodiment of the present disclosure bring beneficial effects as follows: the problem of application layer processing error caused by incapability of reporting the access network information or low access network information reporting efficiency in the related technology is solved, and the effects of accurately feeding back the access network information, greatly improving feedback efficiency and avoiding the application layer processing error are further achieved.

What is claimed is:
1. A method for processing access network information of User Equipment (UE) comprising:
receiving, by a Policy and Charging Enforcement Function (PCEF), a request from a Policy and Charging

Rules Function (PCRF), wherein the received request is used for requesting to report the access network information;

judging, by the PCEF, whether an access network where the UE is located supports reporting of the access network information or not; and when a judgment result is that the access network where the UE is located does not support the reporting of the access network information, reporting, by the PCEF, to the PCRF, second indication information indicating a failure of reporting the access network information, wherein the PCRF sends the second indication information to an Application Function (AF);

wherein the PCEF judges whether the access network where the UE is located supports the reporting of the access network information or not according to a type of an Internet Protocol Connectivity Access Network (IP-CAN).

2. The method as claimed in claim 1, after judging, by the PCEF, whether the access network where the UE is located has support for reporting the access network information or not, further comprising:

when the judgment result is that the access network where the UE is located supports the reporting of the access network information or whether the access network where the UE is located supports the reporting of the access network information or not is not able to be judged, sending, by the PCEF, to the access network a request used for requesting to report the access network information;

when feedback information fed back by the access network does not comprise the access network information, sending, by the PCEF, to the PCRF third indication information, sending, a failure of reporting the access network information, wherein the PCRF sends the third indication information to the AF; and/or, when feedback information fed back by the access network comprises the access network information, sending, by the PCEF, the access network information to the PCRF, wherein the PCRF sends the access network information to the AF.

3. A device for processing access network information of User Equipment (UE) applied to a Policy and Charging Enforcement Function (PCEF), wherein the device comprises a hardware processor configured to execute program components stored on a memory, and the program components comprises:

a seventh receiving component, configured to receive a request from a Policy and Charging Rules Function (PCRF), wherein the received request is used for requesting to report the access network information;

a third judging component, configured to judge whether an access network where the UE is located supports the reporting of the access network information or not; and a first reporting component, configured for the PCEF to, when a judgment result of the third judging component is that the access network where the UE is located does not support the reporting of the access network information, report, to the PCRF, second indication information indicating a failure of reporting the access network information, wherein the PCRF sends the second indication information to an Application Function (AF);

wherein the third judging component is further configured to judge whether the access network where the UE is located supports the reporting of the access network information or not according to a type of an Internet Protocol Connectivity Access Network (IP-CAN).

4. The device as claimed in claim 3, further comprising:

supports the supports the reporting of the access network information, or whether the access network where the UE is located supports the reporting of supports the reporting of the access network information, or whether the access network where the UE is located supports the reporting of the access network information or not is not able to be judged, send to the access network a request used for requesting to report the access network information;

a ninth sending component, configured to, when feedback information fed back by the access network does not comprise the access network information, send to the PCRF third indication information, send to a failure of reporting the access network information, wherein the PCRF sends the third indication information to the AF; and/or, a tenth sending component, configured to, when the feedback information fed back by the access network comprises the access network information, send the access network information to the PCRF, wherein the PCRF sends the access network information to the AF.

* * * * *